(12) United States Patent
Leonardi et al.

(10) Patent No.: US 8,789,566 B2
(45) Date of Patent: *Jul. 29, 2014

(54) VARIOUS IMPROVEMENTS TO STUMP CUTTING TOOL DISCS

(75) Inventors: Joseph A. Leonardi, Auburn, NY (US); Bruce C. Jordan, Auburn, NY (US)

(73) Assignee: Leonardi Manufacturing Co., Inc., Weedsport, NY (US)

( * ) Notice: Subject to any disclaimer, the term of this patent is extended or adjusted under 35 U.S.C. 154(b) by 319 days.

This patent is subject to a terminal disclaimer.

(21) Appl. No.: 12/716,063

(22) Filed: Mar. 2, 2010

(65) Prior Publication Data

US 2010/0218851 A1 Sep. 2, 2010

Related U.S. Application Data

(63) Continuation-in-part of application No. 12/544,146, filed on Aug. 19, 2009, now Pat. No. 8,672,001.

(60) Provisional application No. 61/156,654, filed on Mar. 2, 2009, provisional application No. 61/090,878, filed on Aug. 19, 2008.

(51) Int. Cl.
  *B27C 1/00* (2006.01)

(52) U.S. Cl.
  USPC ........... 144/176; 144/218; 144/230; 144/235; 241/91; 241/292.1

(58) Field of Classification Search
  USPC .............. 144/176, 218, 230, 235, 241, 24.12; 407/30, 33, 40, 43, 46, 47, 56, 66, 67, 407/101, 102, 113; 241/91, 92, 95, 292.1, 241/296, 297
  See application file for complete search history.

(56) References Cited

U.S. PATENT DOCUMENTS 1,269,378 A * 6/1918 Bunch ........................... 144/230
1,549,036 A * 8/1925 Westgard ...................... 144/230

(Continued)

FOREIGN PATENT DOCUMENTS

DE 10304732 8/2004
JP 05-024305 3/1993

(Continued)

OTHER PUBLICATIONS

Definition for cap, Merriam-Webster Dictionary, www.m-w.com, 2013.*

*Primary Examiner* — Bena Miller
(74) *Attorney, Agent, or Firm* — George R. McGuire; Frederick J. M. Price; Bond Schoeneck & King, PLLC

(57) ABSTRACT

The present invention is generally directed to a grinder tool preferably having one or more of the following aspects or features: (i) some, preferably most, of the footprint of its bit being shielded by the disc; (ii) the peripheral edge of the disc is at least partially covered by a rock stop hard surface layer; (iii) non-rigid mounting hardware structured to provide a non-rigid mechanical connection between the well and the bit sub-assembly (for example, the non-rigid mounting hardware may include: a rubber isolator; a mesh isolator; and/or a fluid filled isolator); (iv) a stump grinding tool rotating disc assembly having at least one first type bit sub-assembly (including a bit) and at least one second type bit sub-assembly (including a bit), where: (a) the first type bit sub-assembly has a first bit footprint geometry, (b) the first type bit sub-assembly has a first bit footprint geometry, and (c) the first bit footprint geometry is different than the second bit footprint geometry; (v) a rotating disc assembly includes a disc that includes multiple guide protrusions extending axially from both axial ends of the disc around an angular range leading the angular position of each bit sub-assembly; (vi) a rotating disc assembly having rollers built into the peripheral edge of the disc; and/or (vii) disc assembly with a bit holder member that extends over a portion of the opposite axial faces of the disc.

9 Claims, 32 Drawing Sheets

(56) References Cited

U.S. PATENT DOCUMENTS

| | | | |
|---|---|---|---|
| 3,872,763 A | 3/1975 | Kayahara | |
| 4,363,576 A * | 12/1982 | Zweekly | 407/50 |
| 4,580,930 A * | 4/1986 | Zinner | 407/110 |
| 4,709,736 A | 12/1987 | Bellars | |
| 4,750,396 A | 6/1988 | Gaddis | |
| 4,759,394 A | 7/1988 | Clemenson | |
| 4,947,721 A | 8/1990 | Anderson | |
| 4,974,649 A | 12/1990 | Manning | |
| 5,058,477 A | 10/1991 | MacLennan | |
| 5,085,112 A | 2/1992 | MacLennan | |
| 5,088,371 A | 2/1992 | MacLennan | |
| 5,131,305 A | 7/1992 | MacLennan | |
| 5,211,212 A * | 5/1993 | Carlson et al. | 144/241 |
| 5,395,063 A * | 3/1995 | Schrodl | 241/195 |
| 5,423,361 A | 6/1995 | Richards | |
| 5,555,652 A | 9/1996 | Ashby | |
| 5,743,314 A | 4/1998 | Puch | |
| 5,819,827 A | 10/1998 | Leonardi | |
| 5,966,657 A | 10/1999 | Sporre | |
| 5,996,657 A | 12/1999 | Riesselman | |
| 6,047,749 A | 4/2000 | Lamb | |
| 6,138,725 A | 10/2000 | Leonardi et al. | |
| 6,176,445 B1 | 1/2001 | Shinn | |
| 6,263,930 B1 | 7/2001 | Wiley | |
| 6,299,389 B1 * | 10/2001 | Barazani | 407/110 |
| 6,382,277 B1 | 5/2002 | Paumier | |
| 6,877,535 B1 | 4/2005 | Bennington | |
| 7,100,651 B1 | 9/2006 | Monyak et al. | |
| 7,418,986 B2 | 9/2008 | Watts | |
| 7,484,541 B2 | 2/2009 | Green | |
| 7,600,543 B2 | 10/2009 | Monyak et al. | |
| 7,743,803 B2 | 6/2010 | Paumier | |
| 2003/0145710 A1 | 8/2003 | Hicks | |
| 2003/0209285 A1 | 11/2003 | Ziehm | |
| 2007/0042323 A1 | 2/2007 | Florman | |
| 2008/0105334 A1 | 5/2008 | Leonardi et al. | |
| 2008/0149224 A1 | 6/2008 | Kappel | |

FOREIGN PATENT DOCUMENTS

| | | |
|---|---|---|
| JP | 06-125920 | 5/1994 |
| JP | 2000071203 | 3/2000 |
| JP | 03-233454 | 6/2007 |
| WO | 01/68298 | 9/2001 |
| WO | 03/013773 | 2/2003 |

* cited by examiner

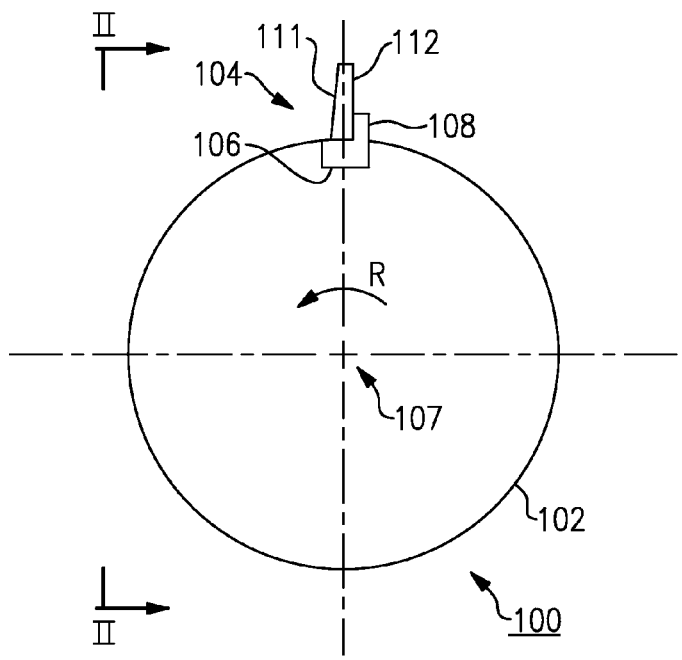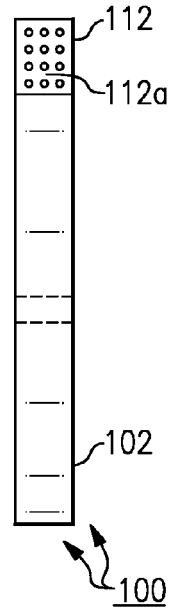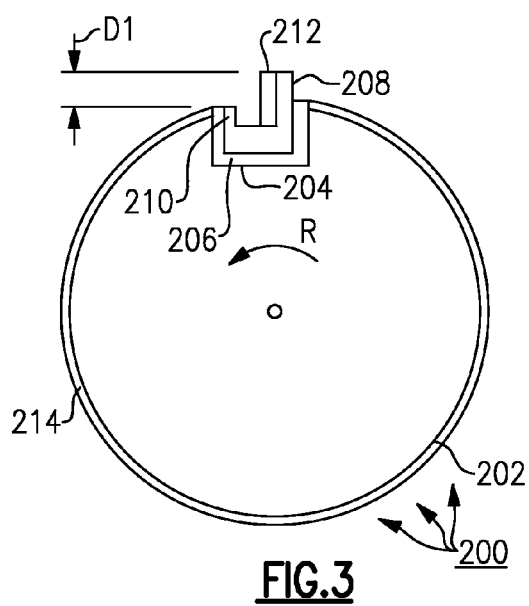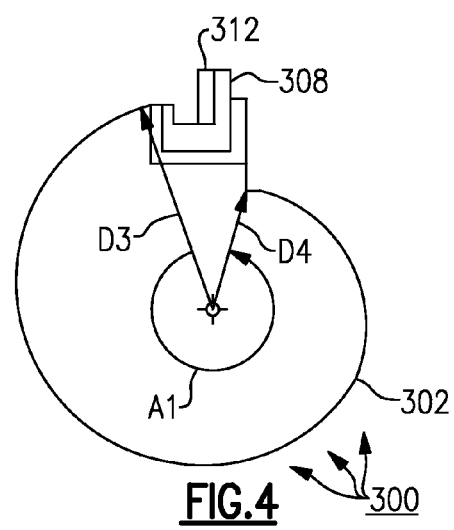
FIG.1 Prior Art
FIG.2 Prior Art
FIG.3
FIG.4

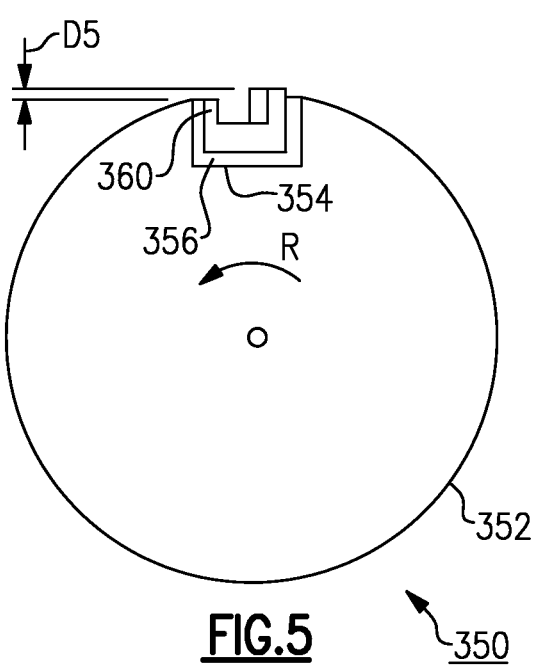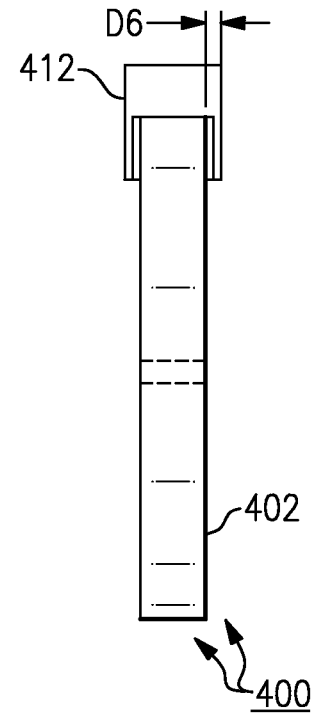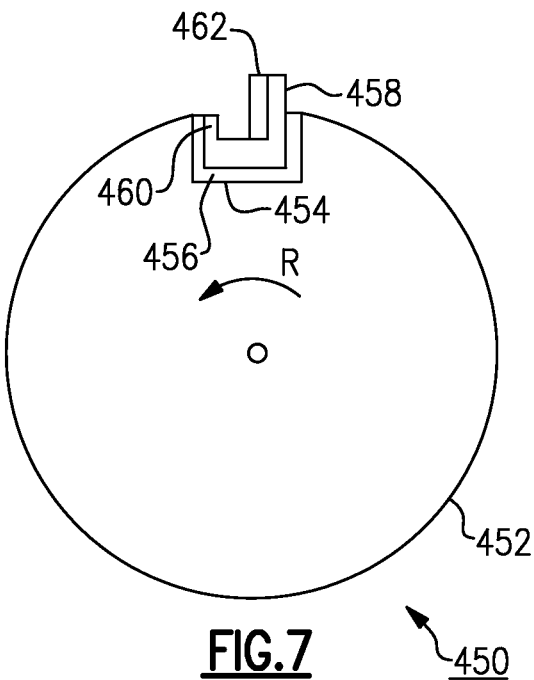

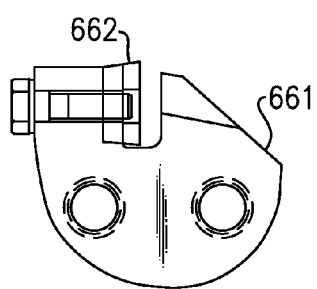
FIG.47
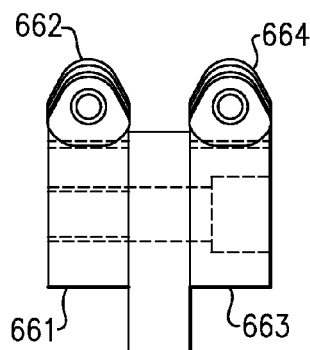
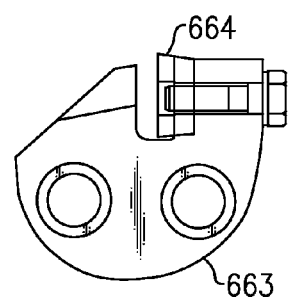
FIG.49
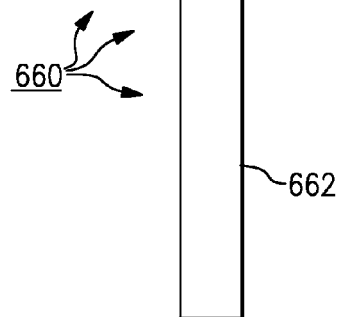
FIG.48

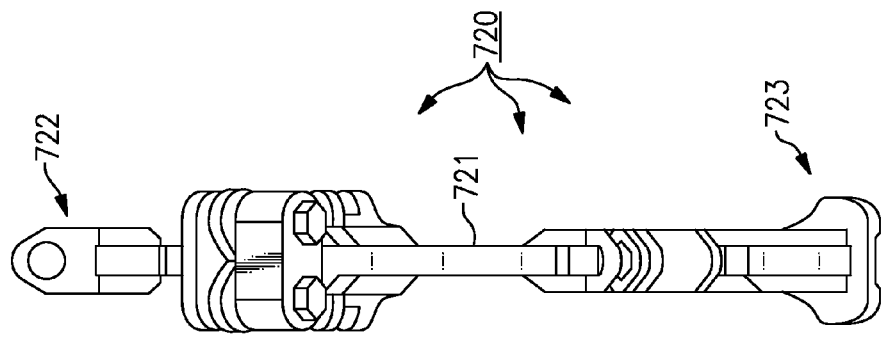
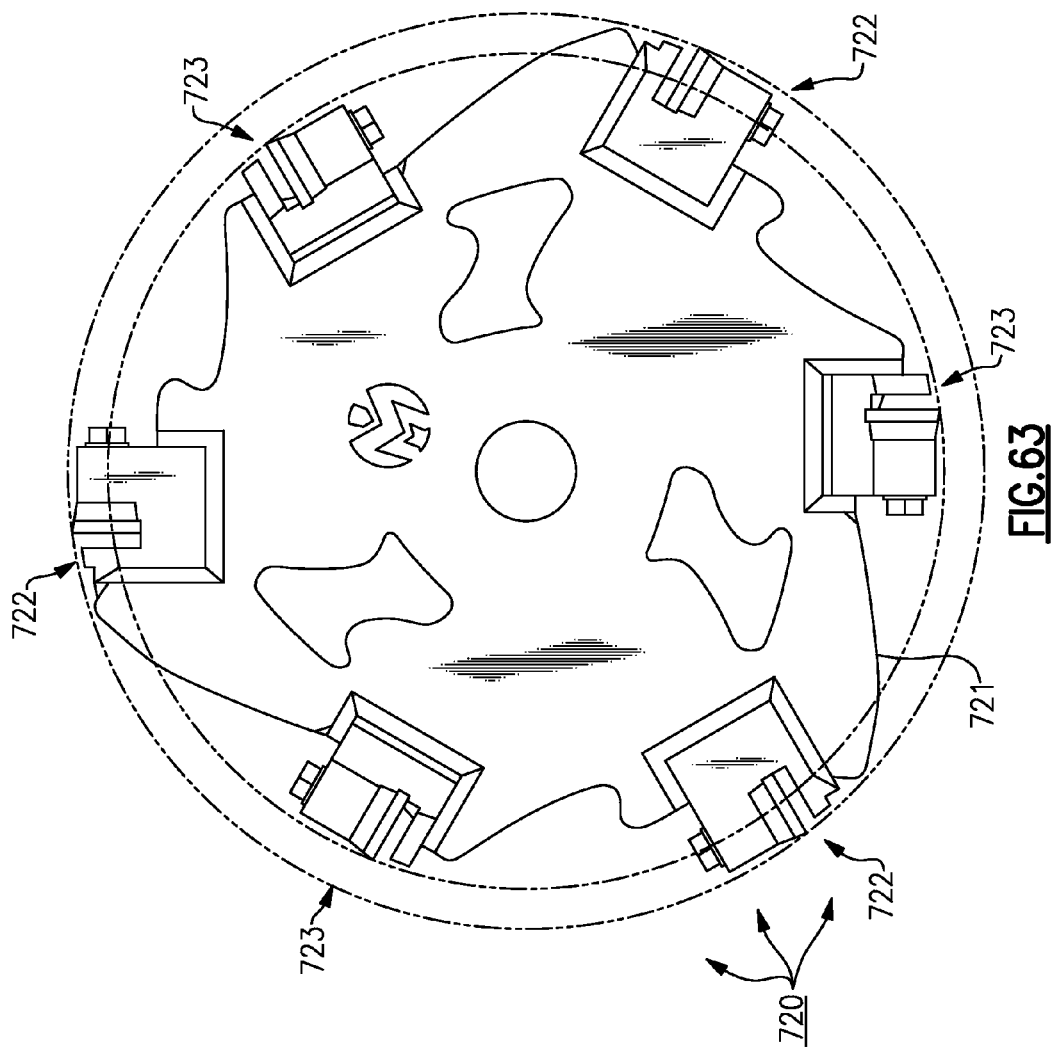

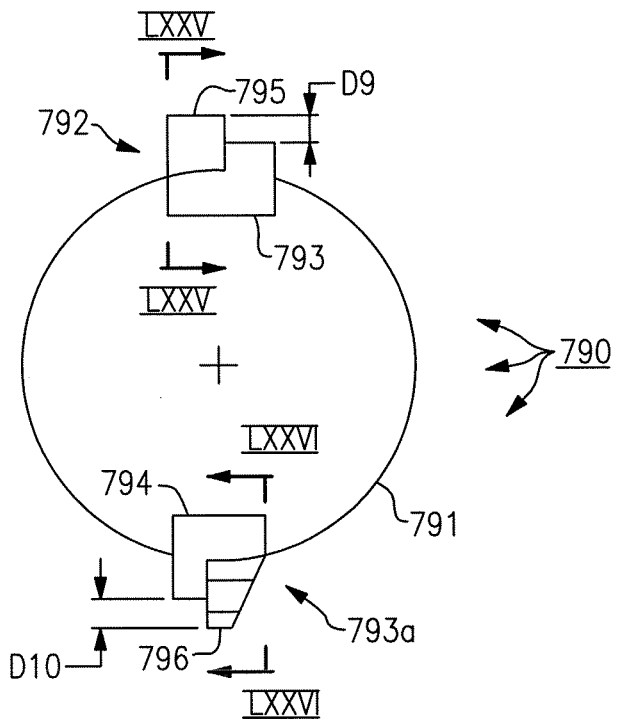
FIG.74
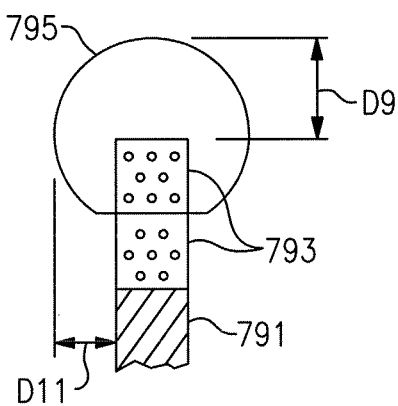
FIG.75
FIG.76

US 8,789,566 B2

VARIOUS IMPROVEMENTS TO STUMP CUTTING TOOL DISCS

The present application claims priority to U.S. provisional patent application No. 61/156,654, filed on Mar. 2, 2009. The present application is also a continuation-in-part of and claims priority to U.S. non-provisional patent application Ser. No. 12/544,146, filed on Aug. 19, 2009 (now issued as U.S. Pat. No. 8,672,001), which is a non-provisional version of U.S. provisional patent application No. 61/090,078, filed on Aug. 19, 2008; all of these documents are hereby incorporated by reference herein in its respective entireties.

BACKGROUND OF THE INVENTION

1. Field of the Invention

The present invention relates to grinding tools (see DEFINITIONS section), more particularly to outdoor grinding tools (see DEFINITIONS section), and also more particularly to rotating disc assemblies (including a disc and bit sub-assembly(ies)) for grinding tools.

2. Description of the Related Art

Stump cutting tools conventionally include a rotating disc assembly that includes a rotating disc and multiple bit sub-assemblies located at regular angular intervals the peripheral edge of the rotating. FIGS. 1 and 2 show a simplified conventional rotating disc assembly 100 including disc 102; and bit sub-assembly 104. Bit sub-assembly includes: bit holder 108; and bit 112. Conventional bit holder 108 provides a substantially rigid mechanical connection (see DEFINITIONS section) between the bit sub-assembly and the rotating disc so that there is substantially no relative motion between the bit sub-assembly and the rotating disc. Angular direction R shows the direction of rotation of the disc in operation.

In FIG. 1, the bit sub-assembly 104 and its pocket 106 are centered at a twelve o'clock position over the center 107 of the disc. FIG. 2, at dotted area 112a, shows the view taken tangent to the top of the disc when the disc is in this twelve o'clock position of FIG. 1. It is this view that defines the "footprint" of the bit. This concept of a "footprint" will be important for understanding certain aspects of the present invention. In the example of FIG. 1 and FIG. 2, the front face of the bit is substantially perpendicular to the viewing vector that defines the foot print of bit 112, but this is not necessarily always true in the prior art, or in the present invention. Both the angular length (that is, angular length in direction R) of the bit sub-assembly and/or a non-orthogonal geometry for the bit itself can cause the front face of the bit to be non-perpendicular to the foot-print defining viewing vector. When the footprint of the bit is substantially perpendicular to the viewing vector, its footprint area will generally be at least approximately equal to the surface area of the front face of the bit. However, when the front face of the bit is not perpendicular to the viewing vector, then its footprint area will be less than the surface area of the front face of the bit.

In conventional usage, this idea of inclining the front face of the bit, forward or backward or not at all, relative to the footprint-defining viewing vector is called a "rake angle." Conventionally, rake angle is adjusted by the grinder designer depending on factors such as soil type and/or rotational speed.

For present purposes, the important thing to note is that the footprint of the bit—that is, dotted area 112a taken perpendicular to the viewing vector—is entirely exposed as the disc rotates in direction R during operation of the grinder. More specifically: (i) no portion of disc 102 is interposed in front of the footprint when viewed from the viewing vector; and (ii) no portion of bit holder 108 is interposed in front of the footprint of the bit as its footprint is viewed from the viewing vector.

U.S. Pat. No. 5,555,652 ("Ashby") discloses a land clearing apparatus that includes a rotating rasp used to shred trees, brush and debris. More specifically, rasp 20 includes drum 22, guard 26, removable impact structures 34 and adaptors 48. As shown in FIG. 2 of Ashby, the removable impact structures and respectively associated are located at regular angular intervals around the rotating drum.

U.S. Pat. No. 5,996,657 ("Riesselman") discloses a stump cutter including a rotatable disk having multiple cutting tool holders. The cutting tool holders each have a cutting tool bit cantilevered therefrom to engage a stump brought into contact with the cutting tool. The cutting tool holder/bit sub-assemblies alternate in the angular direction with sub-assemblies that Riesselman refers to as non-cutting protectors. As shown in FIG. 1 of Riesselman, each bit extend in the radial direction beyond the outermost radial edge of the protectors by a distance of L1. With respect to its protectors and bits Riesselman discloses the following: "In the embodiment shown, the protector 20 is spaced sufficiently far out so that cutting tool bites into an object only to the depth L1 of the hardened cutting tip 16. With traditional stump cutters, no leading protector is provided and the cutter wheel could inadvertently overbite and cause wheel hang-up. I have found that with use of a protector with a massive non-cutting leading edge which is placed ahead of the lead cutting tool a distance denoted by P1, the problem of broken cutting tools is substantially eliminated. That is, the non-cutting leading edge of the protector can be spaced rotationally ahead of the cutting tool to provide protection to the cutting tool. I have found that even with P1 distances of six or seven inches I can still provide protection for the first stage cutter and holder located behind the protector . . . . By having a massive protector that has a greater mass than the cutting tool and is not cantilevered outward as the cutting tool is, the protector can absorb shocks and impacts through gradual abrasion of the protector while the first stage cutting teeth of a row of cutting teeth can be protected." Riesselman does not seem to disclose how large its dimension L1 is supposed to be.

U.S. Pat. No. 6,138,725 ("Leonardi 1") discloses various operating angles and/or angles between components associated with a stump grinding tool rotating disc.

U.S. Pat. No. 6,176,445 ("Shinn") discloses a cutter tooth located on the outer peripheral surface of a rotatable cutter adapted for clearing, mulching and grinding trees.

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

The present invention is generally directed to a grinder tool preferably having one or more of the following aspects or features: (i) some, preferably most, of the footprint of its bit being shielded by the disc; (ii) the peripheral edge of the disc is at least partially covered by a rock stop hard surface layer; (iii) non-rigid mounting hardware structured to provide a non-rigid mechanical connection between the well and the bit sub-assembly (for example, the non-rigid mounting hardware may include: a rubber isolator; a mesh isolator; and/or a fluid filled isolator); (iv) a stump grinding tool rotating disc assembly having at least one first type bit sub-assembly (including a bit) and at least one second type bit sub-assembly (including a bit), where: (a) the first type bit sub-assembly has a first bit footprint geometry, (b) the first type bit sub-assembly has a first bit footprint geometry, and (c) the first bit footprint geometry is different than the second bit footprint geometry; (v) a rotating disc assembly includes a disc that includes multiple guide protrusions extending axially from both axial ends of the disc around an angular range leading the angular position of each bit sub-assembly; (vi) a rotating disc assembly having rollers built into the peripheral edge of the disc; and/or (vii) disc assembly with a bit holder member that extends over a portion of the opposite axial faces of the disc.

Various embodiments of the present invention may exhibit one or more of the following objects, features and/or advantages:

(i) reduction of mechanical shocks due to square impacts between bits and hard debris in the soil (for example rocks);

(ii) reduction of equipment breakage due to square impacts between bits and hard debris in the soil (for example rocks);

(iii) reduction of flying debris occasioned by stump grinding due to square impacts between bits and hard debris in the soil (for example rocks);

(iv) use of rock stop prevents and/or reduces damage caused by physical interference with hard debris;

(v) use of rock stop prevents and/or reduces groove from being worn into the disc in the vicinity of the leading edge of a well and associated bit assembly; and (iv) use of rock stop made of a soft/hard material matrix collects dirt in operation and provides a helpful dirt/dirt interface between the disc and the dirt within which it is rotating and grinding.

According to one aspect of the present invention, a rotating disc assembly includes a rotating disc member, a first bit and a hard surface layer. The rotating disc member includes a peripheral edge, with the disc member and its rotation defining a frontwards angular direction. The first bit that is mechanically connected to the peripheral edge of the disc member. The hard surface layer is located around a portion of the peripheral edge of the rotating disc in the vicinity of the bit and in the frontwards angular direction relative to the first bit. The hard surface layer is harder than the rotating disc member.

According to a further aspect of the present invention, a rotating disc assembly includes: a bit securing sub-assembly (this may include, for example, a rotating disc member, a bit holder member, a bit cap, a bit backing member and/or an isolator member); and a first bit. The bit securing sub-assembly includes a rotating disc member defining a peripheral edge. The first bit is mechanically connected to the peripheral edge of the disc member. The first bit and the bit securing sub-assembly are sized, shaped, located and/or connected so that a footprint of the first bit is at least partially shielded by a corresponding footprint of the bit securing sub-assembly.

According to a further aspect of the present invention, a rotating disc assembly includes: a rotating disc member comprising a peripheral edge; a first bit that is mechanically connected to the peripheral edge of the disc member; and a first isolator member that is located at least substantially between the first bit and the rotating disc member. The first isolator member is flexible so that the mechanical connection between the rotating disc and the bit is non-rigid.

According to a further aspect of the present invention, a rotating disc assembly includes: a rotating disc member; a first bit holder sub-assembly; and a second bit holder sub-assembly. The rotating disc member includes a peripheral edge. The first bit holder sub-assembly is mechanically connected to the peripheral edge of the rotating disc member. The second bit holder sub-assembly is mechanically connected to the peripheral edge of the rotating disc member. The first bit holder assembly includes a first bit having a first bit footprint. The second bit holder assembly includes a second bit having a second bit footprint. The first bit footprint is sized and/or shaped differently than the second bit footprint.

According to a further aspect of the present invention, a rotating disc assembly includes: a rotating disc member and a first bit holder sub-assembly. The rotating disc member defines a radial direction and an axial direction. The disc member and its rotation define a frontwards angular direction. The first bit holder sub-assembly is mechanically connected to the peripheral edge of the rotating disc member. The rotating disc member includes a peripheral edge, a first major axial surface, a second axial major surface, a first protrusion guide and a second protrusion guide. The first protrusion guide extends in the axial direction from the first major axial surface at a location in the vicinity of the first bit holder assembly, radially inwardly of the peripheral edge and in the angular frontwards direction relative to the first bit holder assembly. The second protrusion guide extends in the axial direction from the second major axial surface at a location in the vicinity of the first bit holder assembly, radially inwardly of the peripheral edge and in the angular frontwards direction relative to the first bit holder assembly.

According to a further aspect of the present invention, a rotating disc assembly includes: a rotating disc member; a first bit and a roller. The rotating disc member includes a peripheral edge. The disc member and its rotation define a frontwards angular direction. The first bit that is mechanically connected to the peripheral edge of the disc member. The roller is rotatably mechanically connected to the rotating disc member and located in the vicinity of the peripheral edge and the first bit in the frontwards angular direction relative to the first bit.

According to a further aspect of the present invention, a rotating disc assembly includes: a rotating disc member; a first bit holder member; and a first bit. The rotating disc member defines a radial direction and an axial direction. The disc member and its rotation define a frontwards angular direction. The rotating disc member comprises a peripheral edge, a first major axial surface, a second axial major surface. The first bit is mechanically connected to the first bit holder. The first bit holder comprises a first disc engaging flange and a second disc engaging flange. The first bit holder is mechanically connected to the rotating disc member so that the first disc engaging flange extends over a portion of the first major axial surface and the second disc engaging flange extends over a portion of the second major axial surface.

BRIEF DESCRIPTION OF THE DRAWINGS

The present invention will be more fully understood and appreciated by reading the following Detailed Description in conjunction with the accompanying drawings, in which:

FIGS. 1 to 2 shows a prior art rotating disc assembly for a stump grinding tool.

FIG. 3 shows a first embodiment of a rotating disc assembly according to the present invention FIG. 4 shows a second embodiment of a rotating disc assembly according to the present invention.

FIG. 5 shows a third embodiment of a rotating disc assembly 350 according to the present invention.

FIG. 6 shows a fourth embodiment of a rotating disc assembly according to the present invention.

FIG. 7 shows a fifth embodiment of a rotating disc assembly according to the present invention.

FIGS. 47 to 49 show various portions of a thirteenth embodiment of a rotating disc assembly according to the present invention.

FIGS. 63, 64, 65 and 67 show an eighteenth embodiment of a rotating disc assembly according to the present invention.

FIGS. 74 to 76 show various portions of a twenty-fifth embodiment of a rotating disc assembly according to the present invention.

DETAILED DESCRIPTION OF THE INVENTION

Figure 8A:
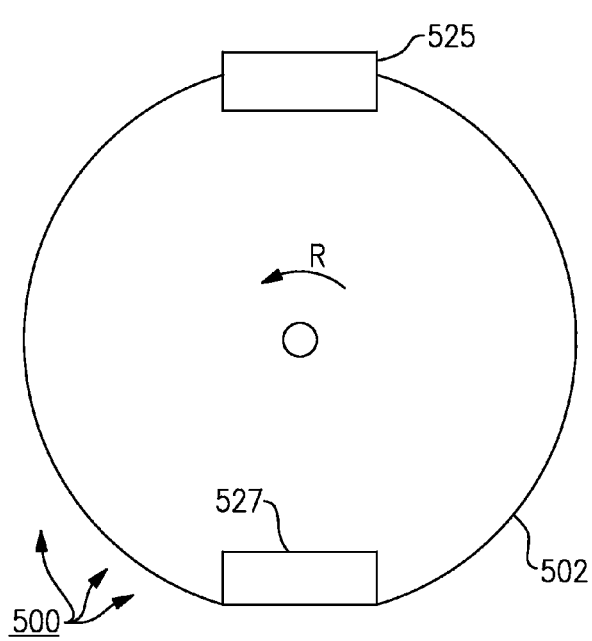
FIGS. 8a and 8b show a sixth embodiment of a rotating disc assembly according to the present invention.

FIG. 3 shows rotating disc assembly 200 according to the present invention, the assembly 200 including: disc (see DEFINITIONS section) 202; mounting hardware 206; bit holder (see DEFINITIONS section) 208; bit (see DEFINITIONS section) 212; and rock stop layer 214.

FIG. 4 shows rotating disc assembly 300 according to the present invention, the assembly 300 including: disc 302; bit holder 308; and bit 312.

FIG. 5 shows a rotating disc assembly 350 according to the present invention, the assembly 350 including: disc 352, mounting hardware 356; and a bit holder (including leading portion 360).

FIG. 6 shows a rotating disc assembly 400 according to the present invention, the assembly 400 including: disc 402; and bit 412.

FIG. 7 shows a rotating disc assembly 450 according to the present invention, the assembly 450 including: disc 452, mounting hardware 456; bit holder 458 (including leading portion 460); and bit 462.

Figure 8B:
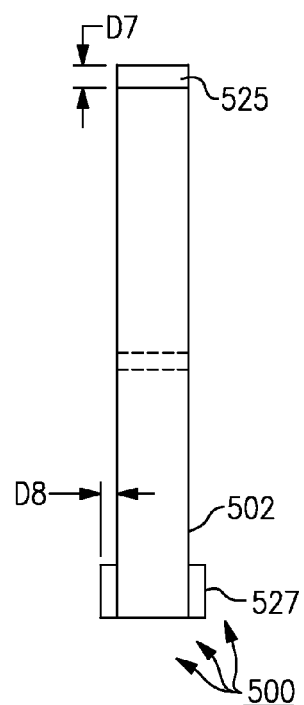

FIGS. 8a and 8b show a rotating disc assembly 500 including: first bit 525; second bit 527; and disc member 502.

FIGS. 9a to 9e show various portions of rotating disc assembly 549, including: bit holders 550; bits 552; bit securing screws 553; disc member 554; isolator members 556; and rock stop layers 557.

FIGS. 10 to 15 show various portions of rotating disc assembly 560, including: bit holders 561; bits 562; bit securing screws 563; disc member 564; and isolator members 566.

Figure 16:
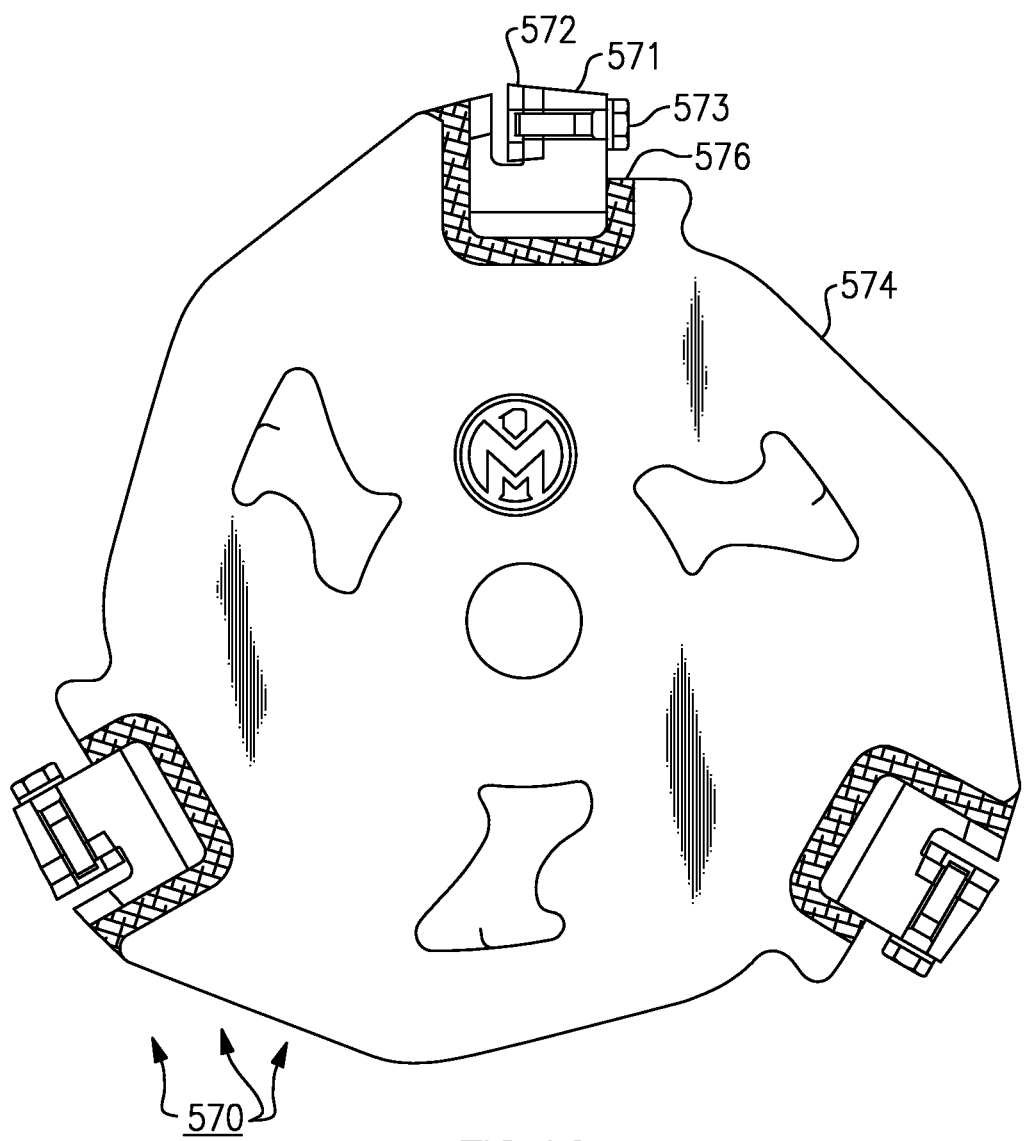
FIG. 16 shows a ninth embodiment of a rotating disc assembly according to the present invention.

FIG. 16 shows rotating disc assembly 570, including: bit holders 571; bits 572; bit securing screws 573; disc member 574; and isolator members 576.

Figure 17:
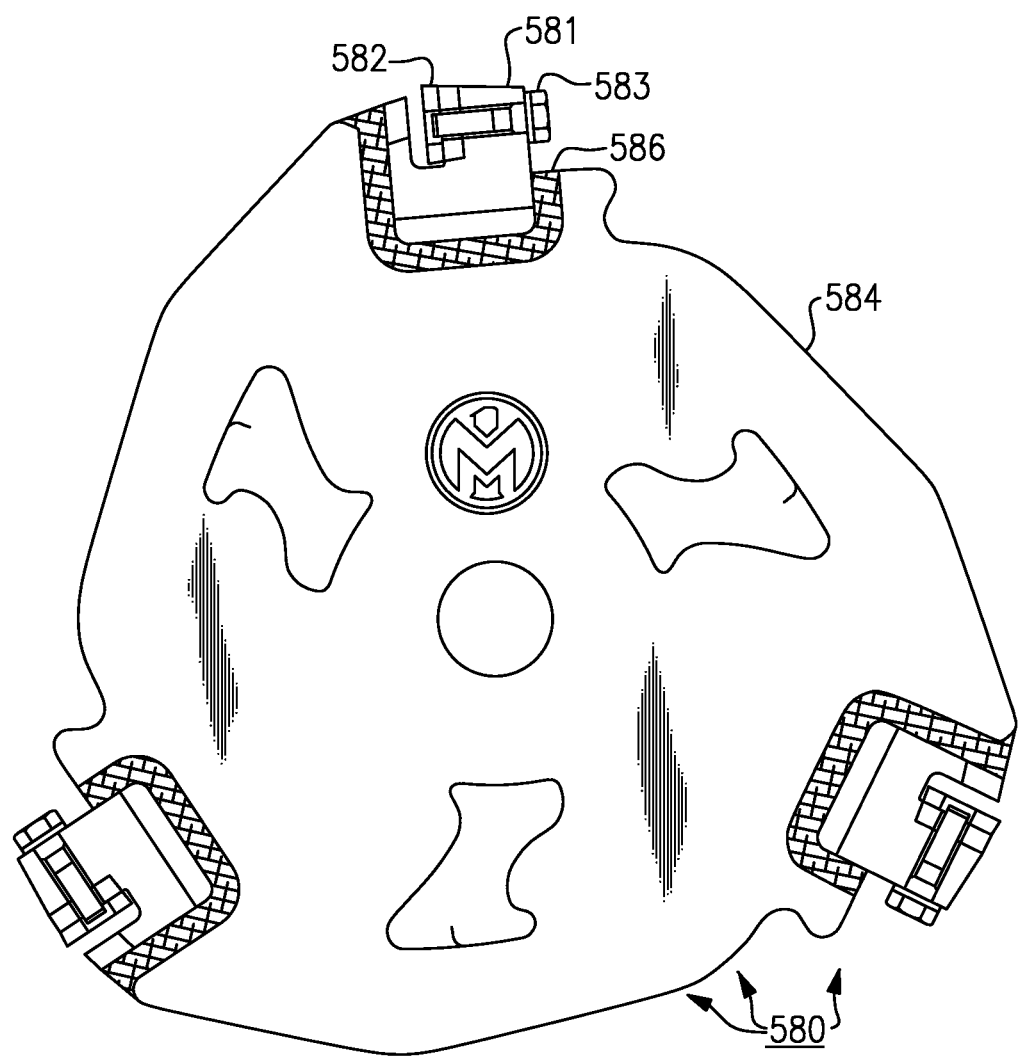
FIG. 17 shows a tenth embodiment of a rotating disc assembly according to the present invention.
Figure 18:
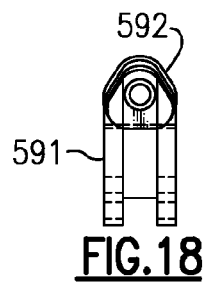
FIGS. 18 to 22 show various portions of an eleventh embodiment of a rotating disc assembly according to the present invention.
Figure 19:
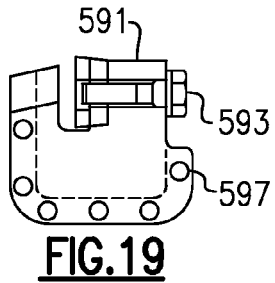
Figure 20:
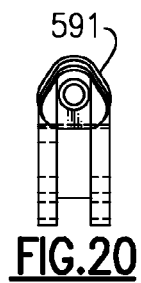
Figure 21:
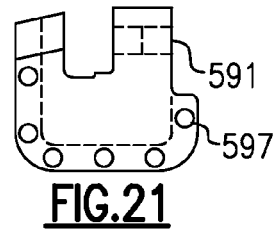
Figure 22:
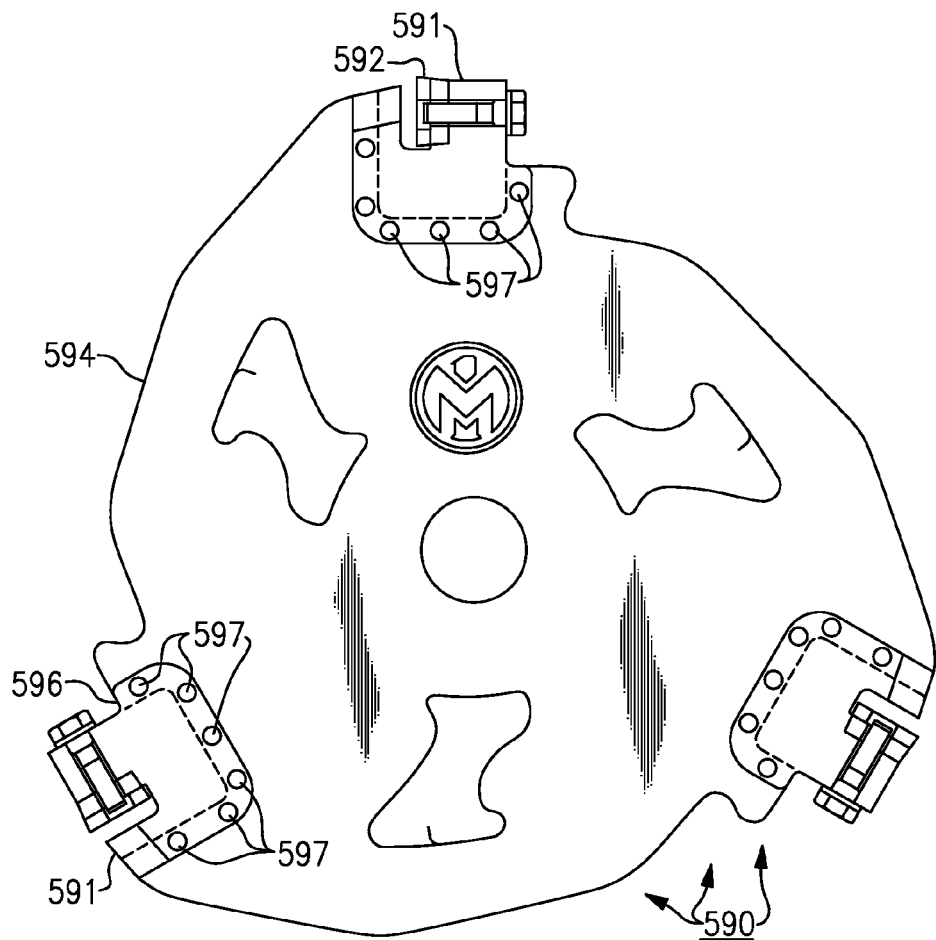

FIG. 17 shows rotating disc assembly 580, including: bit holders 581; bits 582; bit securing screws 583; disc member 584; and isolator members 586.

FIGS. 18 to 22 show various portions of rotating disc assembly 590, including: bit holders 591; bits 592; bit securing screws 593; disc member 594; isolator member 556; and bit holder securing hardware 597.

Figure 23:
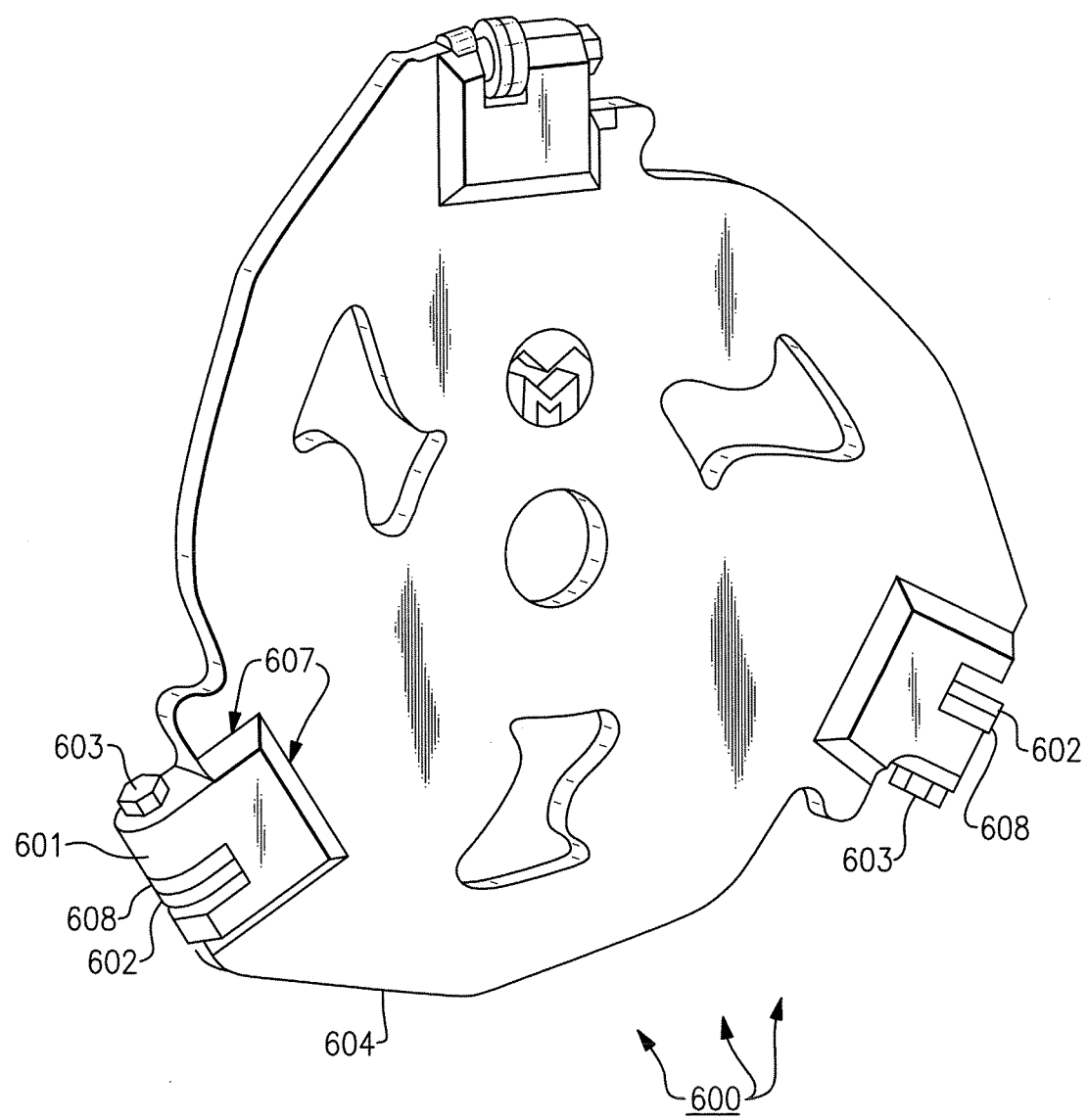
FIG. 23 shows an embodiment of a bit holder assembly suitable for use in the present invention.

FIG. 23 shows bit holder assembly 600, including: bit holders 601; bits 602; bit securing screws 603; disc member 604; bit holder securing hardware 607; and bit backing members 608.

Figure 24:
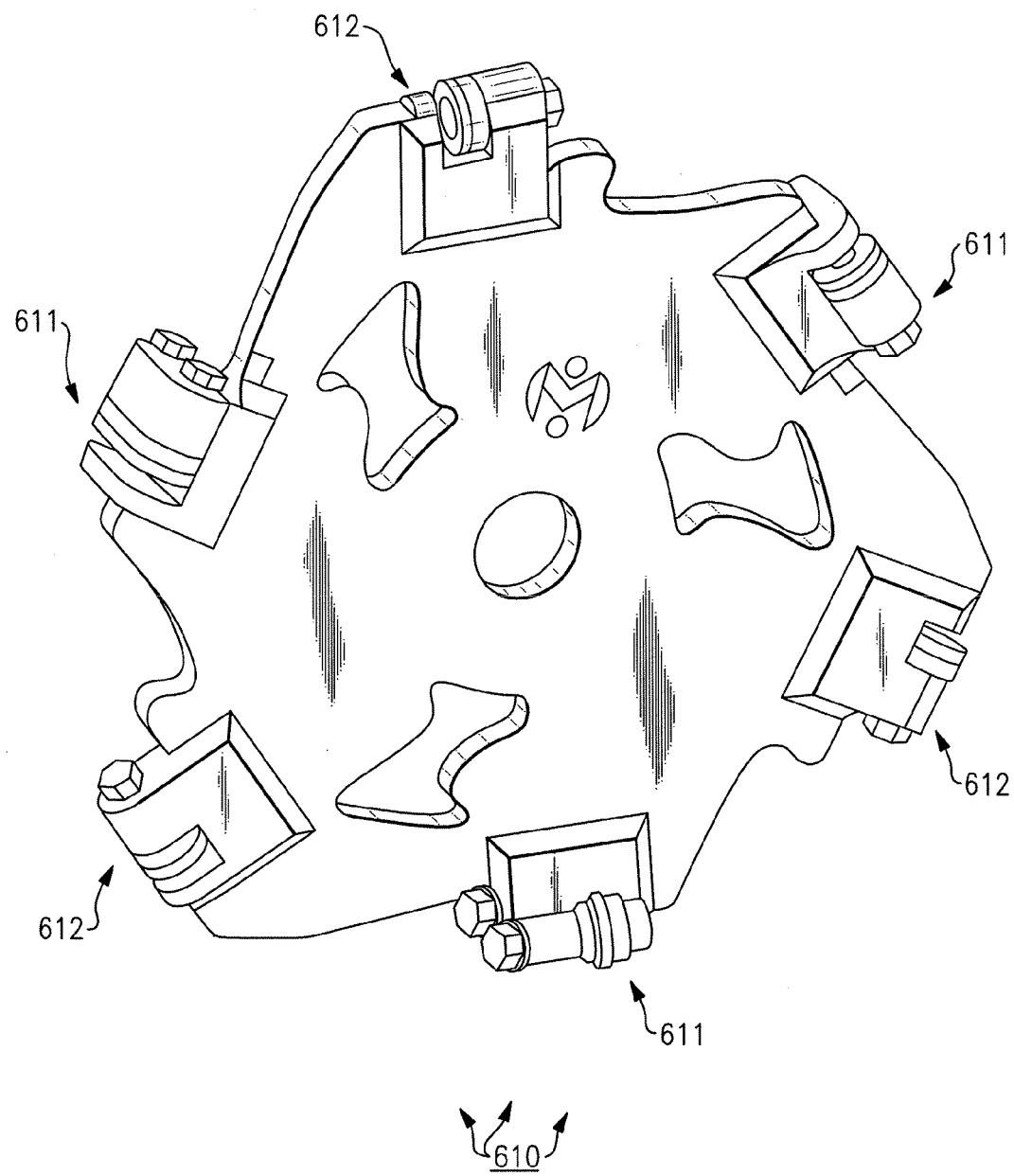
FIG. 24 shows a twelfth embodiment of a rotating disc assembly according to the present invention.

FIG. 24 shows rotating disc assembly 610, including: first type bit holder sub-assemblies 611; and second type bit holder sub-assemblies 612.

Figure 27:
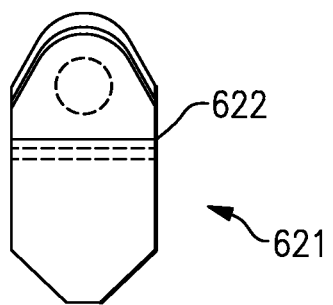
FIGS. 25 and 27 show a bit holder assembly suitable for use in the present invention.
Figure 25:
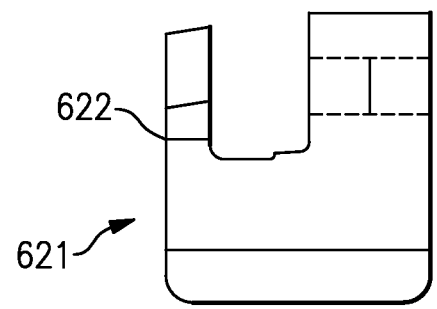

FIGS. 25 and 27 show bit holder 621 including separation line 622.

Figure 28:
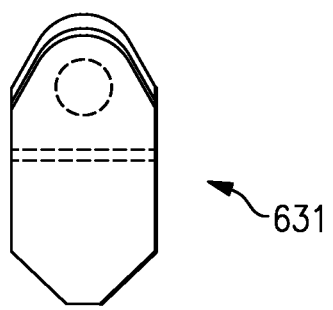
FIGS. 28 and 26 show a two piece bit holder suitable for use in the present invention.
Figure 26:
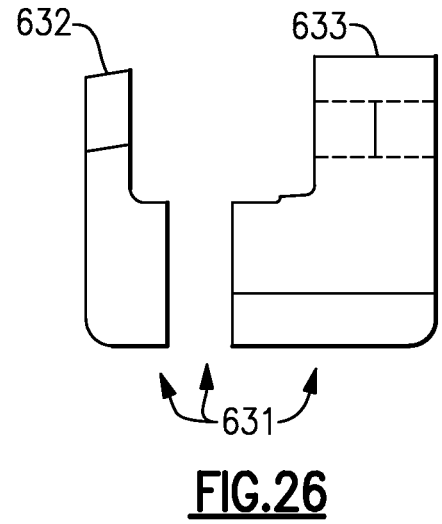
Figure 29:
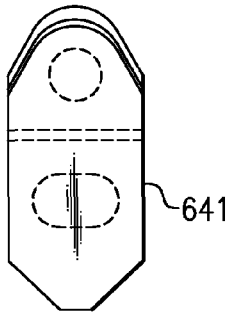
FIGS. 29 to 36 show various portions of a bit holder sub-assembly suitable for use in the present invention.
Figure 32:
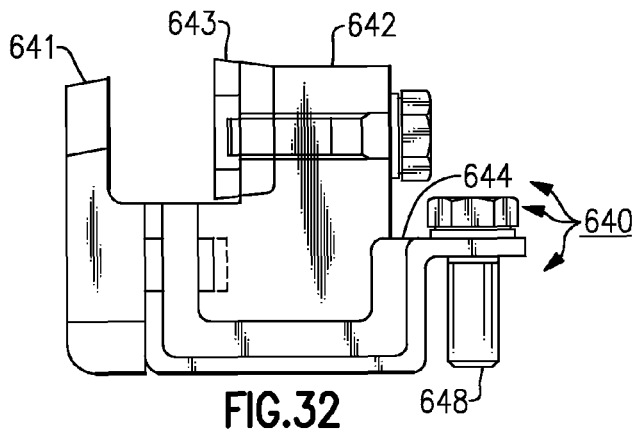
Figure 30:
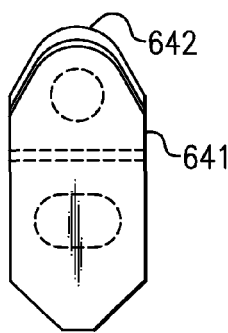
Figure 31:
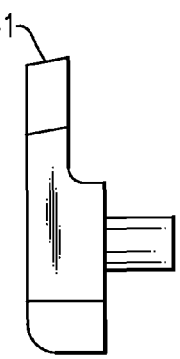
Figure 33:
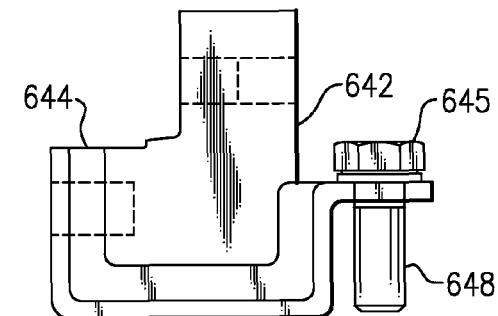
Figure 34:
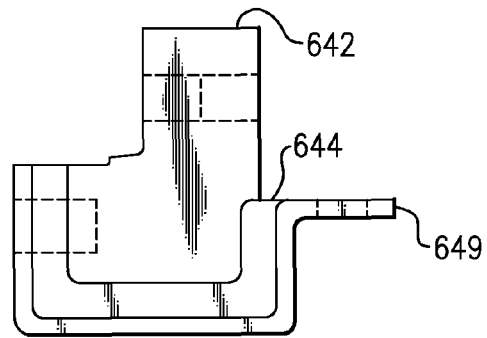
Figure 35:
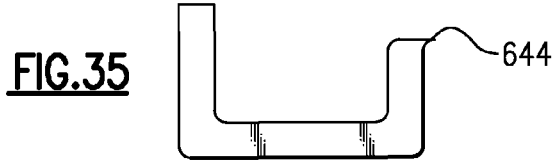
Figure 36:
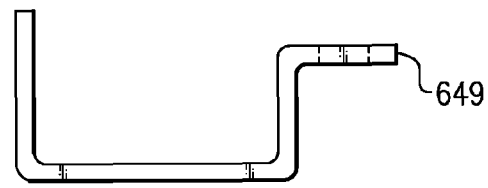
Figure 37:
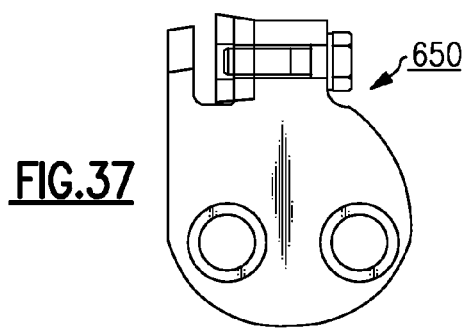
FIGS. 37 to 46 show various different embodiments of bit holder assemblies suitable for use in the present invention.
Figure 42:
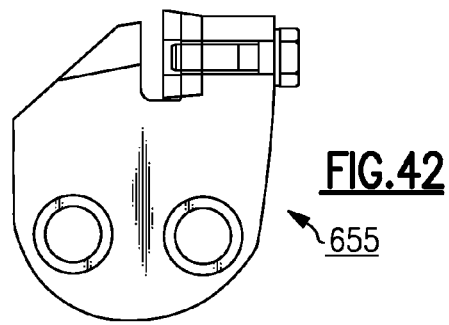
Figure 38:
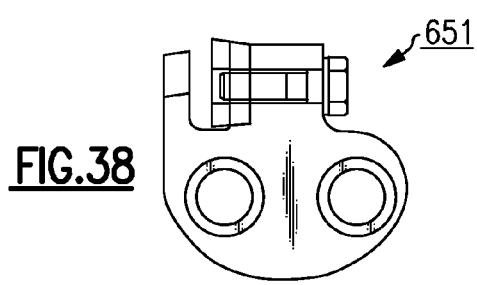
Figure 43:
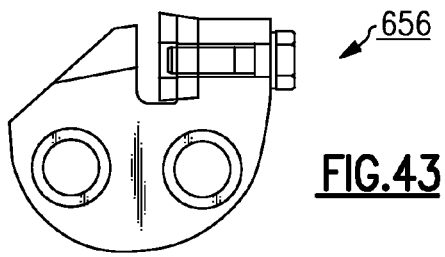
Figure 39:
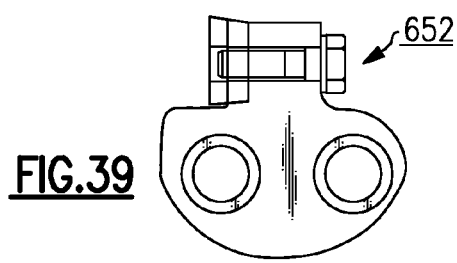
Figure 44:
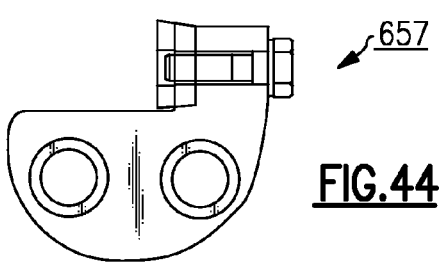
Figure 40:
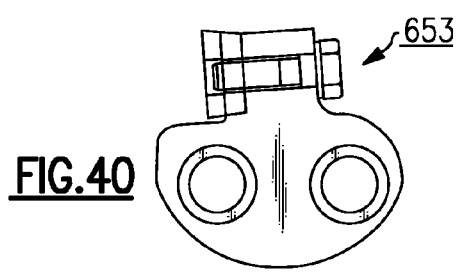
Figure 45:
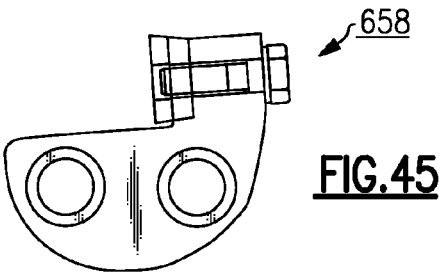
Figure 41:
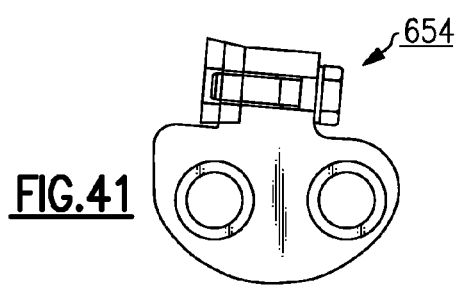
Figure 46:
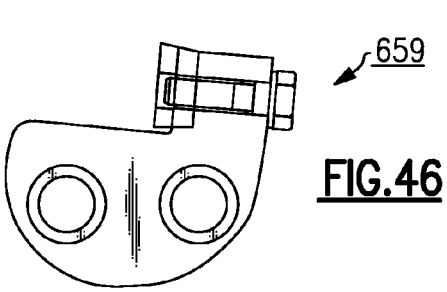
Figure 50:
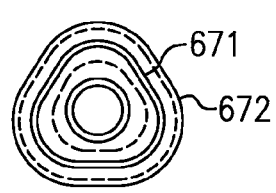
FIGS. 50 to 55 show various portions of a bit holder sub-assembly suitable for use in the present invention.
Figure 53:
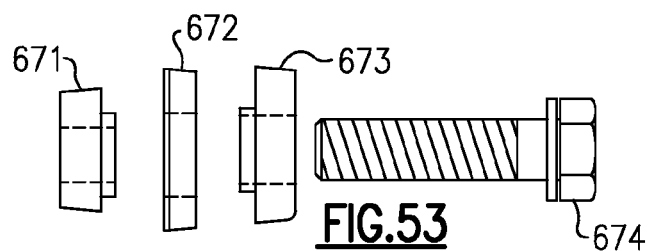
Figure 51:
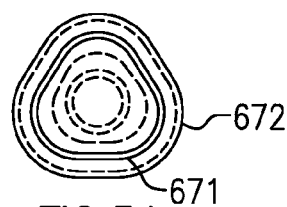
Figure 54:
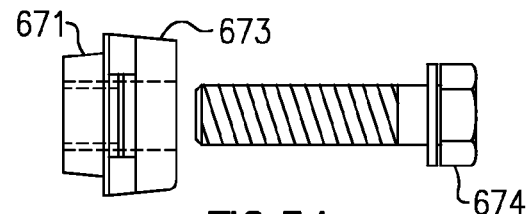
Figure 52:
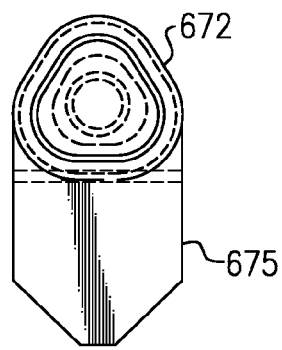
Figure 55:
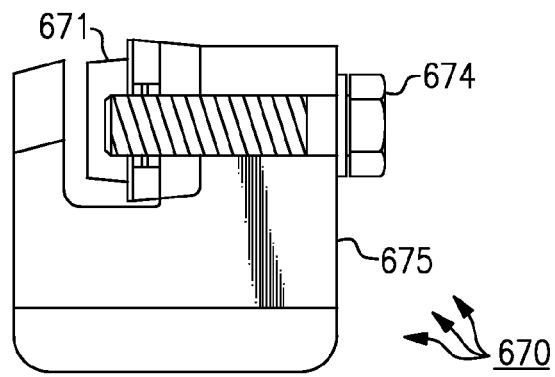

FIGS. 28 and 26 show two piece bit holder 631, including first bit holder piece 632 and second bit holder piece 633.

FIGS. 29 to 36 show various portions of bit holder sub-assembly 640, including: first bit holder piece 641; bit 643; second bit holder piece 642; isolator member 644; pocket liner member 649; and pocket liner securing screw 645. The first bit holder piece helps shield the footprint of the bit. Generally the first bit holder piece will be made of a material that is less brittle, but also less able to cut than the material of the bit is shields. For example, the first bit holder piece is preferably made of steel and the bit is preferably made of relatively brittle carbide.

FIGS. 37 to 46 show various different embodiments of bit holder assemblies 650, 651, 652, 653, 654, 655, 656, 657, 658, 659 according to the present invention.

FIGS. 47 to 49 show various portions of rotating disc assembly 660, including: first bit piece 661; second bit holder piece part 663; and bit piece-parts 662, 664.

FIGS. 50 to 55 show various portions of bit holder sub-assembly 670, including: bit cap 671; bit 672; bit backing member 673; bit securing screw 674; and bit holder 675.

Figure 56:
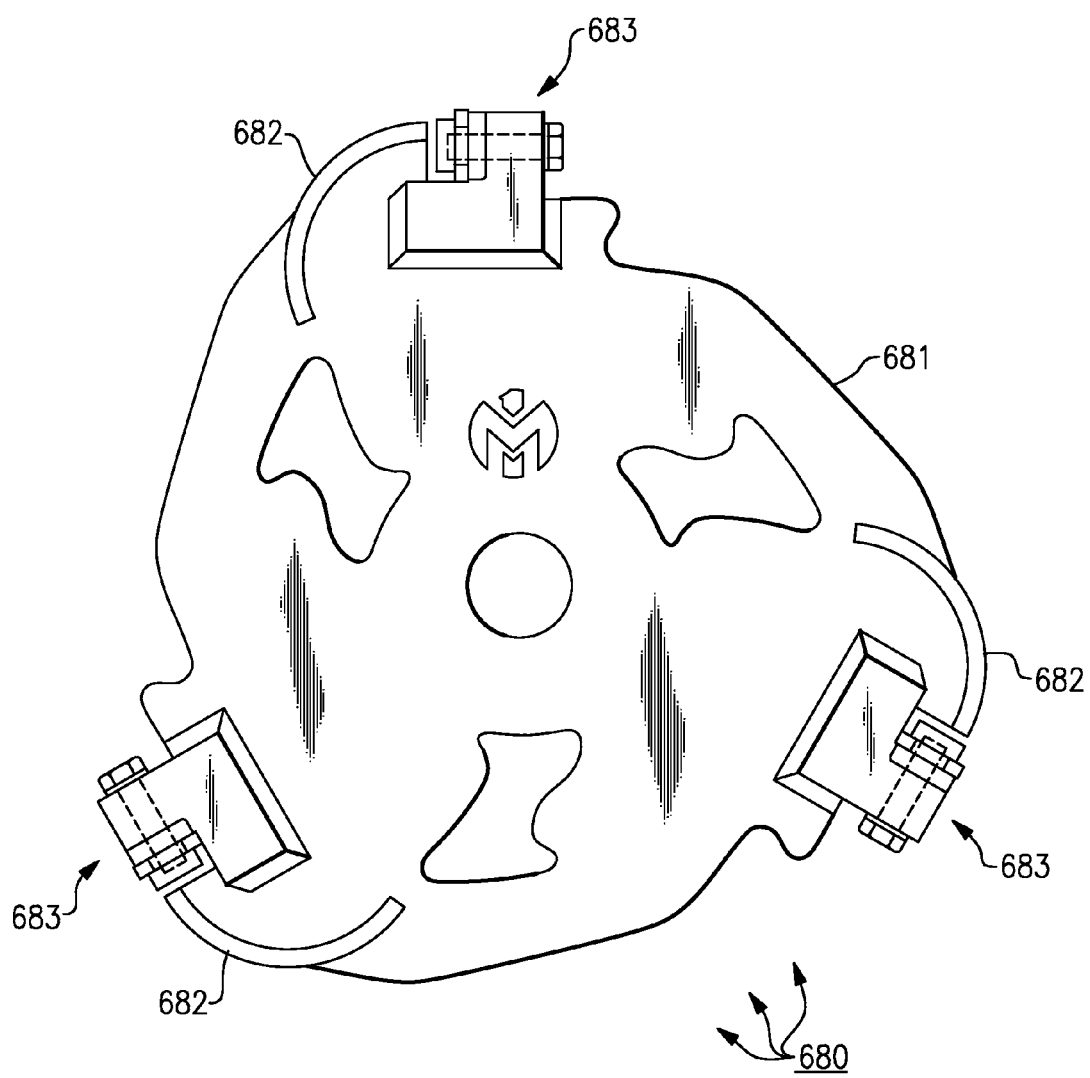
FIGS. 56 and 57 show a fourteenth embodiment of a rotating disc assembly according to the present invention.
Figure 57:
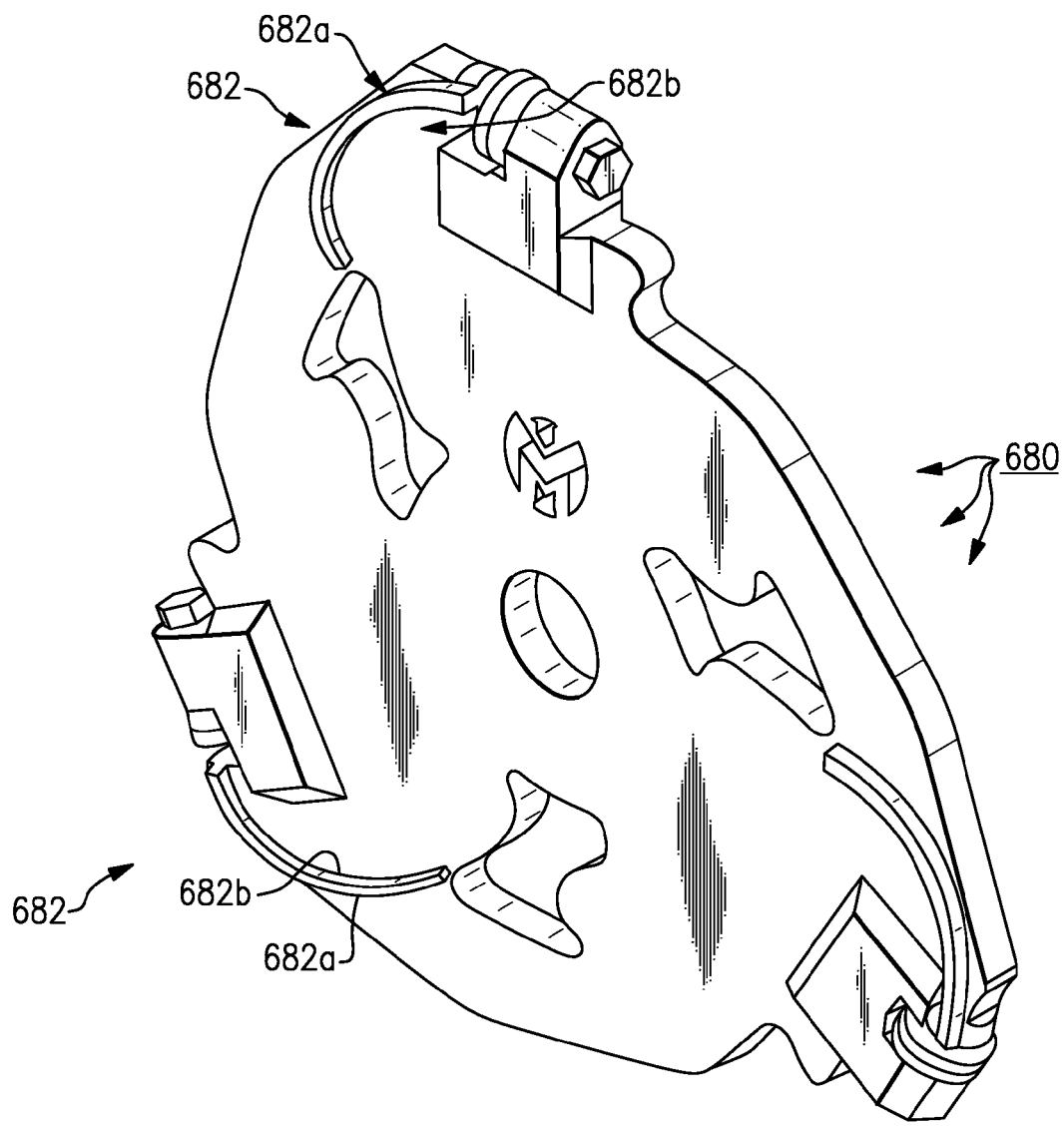

FIGS. 56 and 57 show rotating disc assembly 680, including axial extending protrusions 682; disc member 681; and bit holder sub-assemblies 683. The protrusions include rock stop side 682a and chip flow side 682b.

Figure 58A:
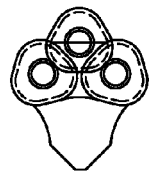
FIGS. 58a to 58y show various bit holder sub-assemblies suitable for use in the present invention.
Figure 58B:
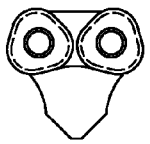
Figure 58C:
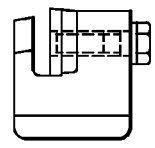
Figure 58D:
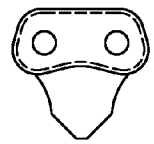
Figure 58E:
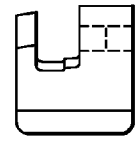
Figure 58F:
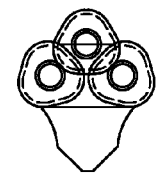
Figure 58G:
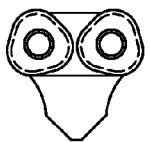
Figure 58H:
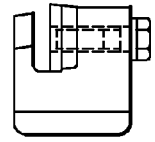
Figure 58I:
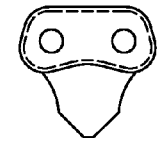
Figure 58J:
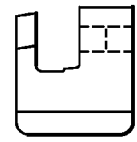
Figure 58K:
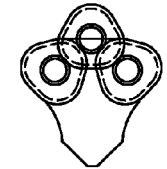
Figure 58L:
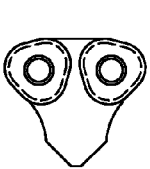
Figure 58M:
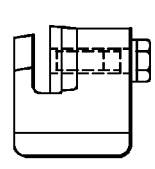
Figure 58N:
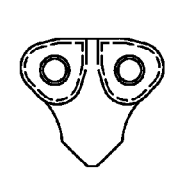
Figure 58O:
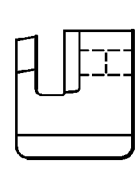
Figure 58P:
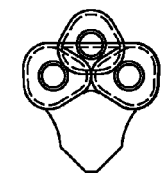
Figure 58Q:
Figure 58R:
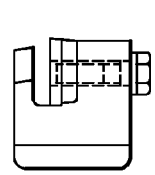
Figure 58S:
Figure 58T:
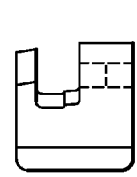
Figure 58U:
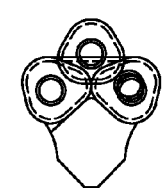
Figure 58V:
Figure 58W:
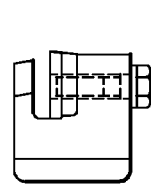
Figure 58X:
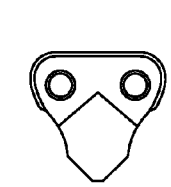
Figure 58Y:
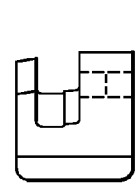
Figure 83:
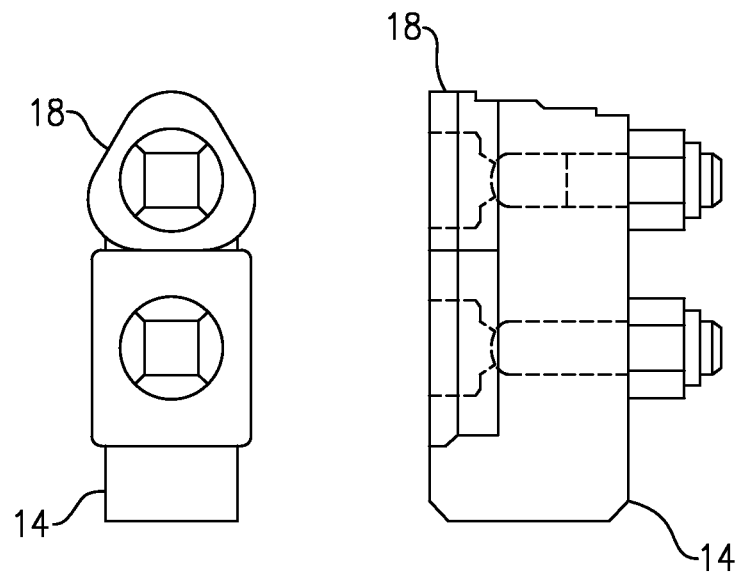
Figure 84:
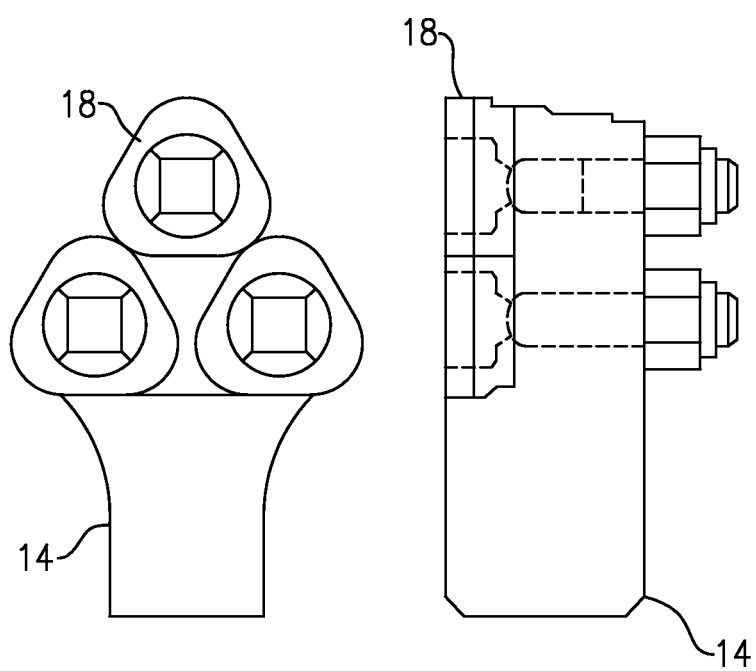
Figure 85:
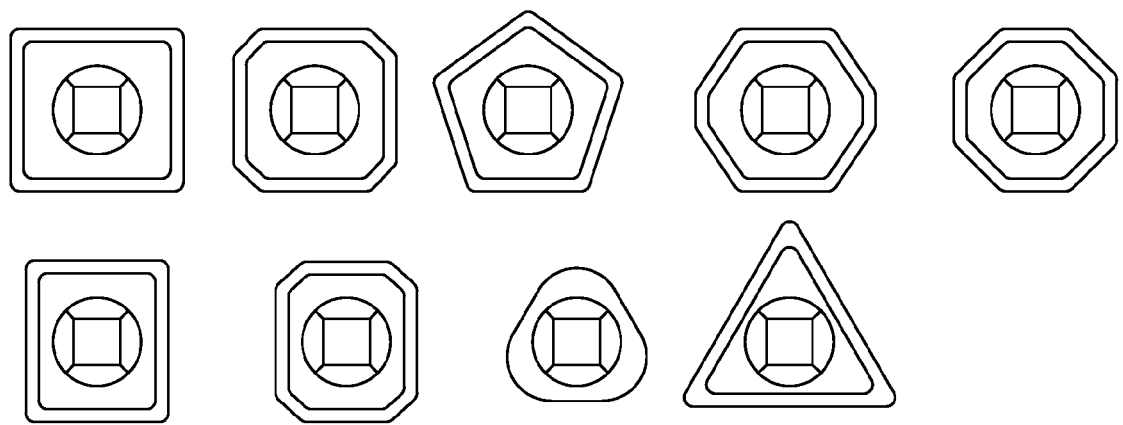
Figure 86:
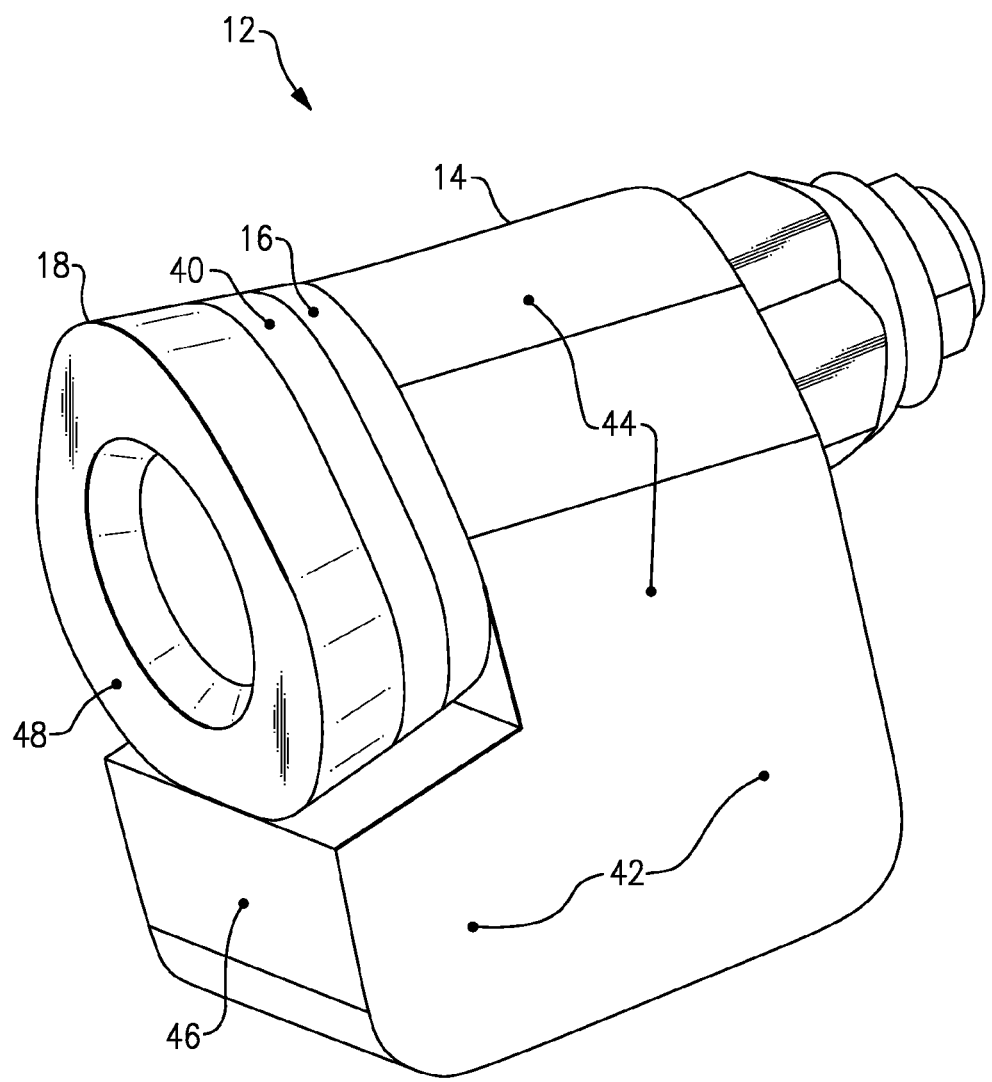

FIGS. 58a to 58y show various bit holder sub-assemblies according to the present invention. Many of these bit holder sub-assemblies include multiple bit piece-parts (see also FIGS. 81 to 85). In these embodiments, the bit footprint is made of the union of the respective footprints of its constituent bit piece parts. As shown in FIG. 83, bit piece-parts of different shaped footprints can be combined. However, care should be taken so that portions of the bit holder that lie behind the aggregate bit footprint are completely shielded by the aggregate bit footprint. For example, the embodiment of FIG. 83 is not preferred in the sense that some of the bit holder, between the triangular bit piece-part and the rectangular bit piece-part is unshielded.

Figure 59:
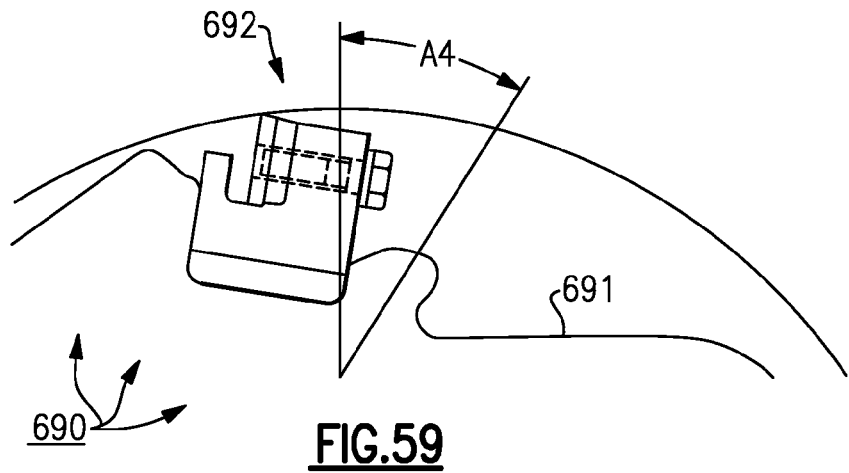
FIGS. 59 and 60 show various portions of a fifteenth embodiment of a rotating disc assembly according to the present invention.
Figure 60:
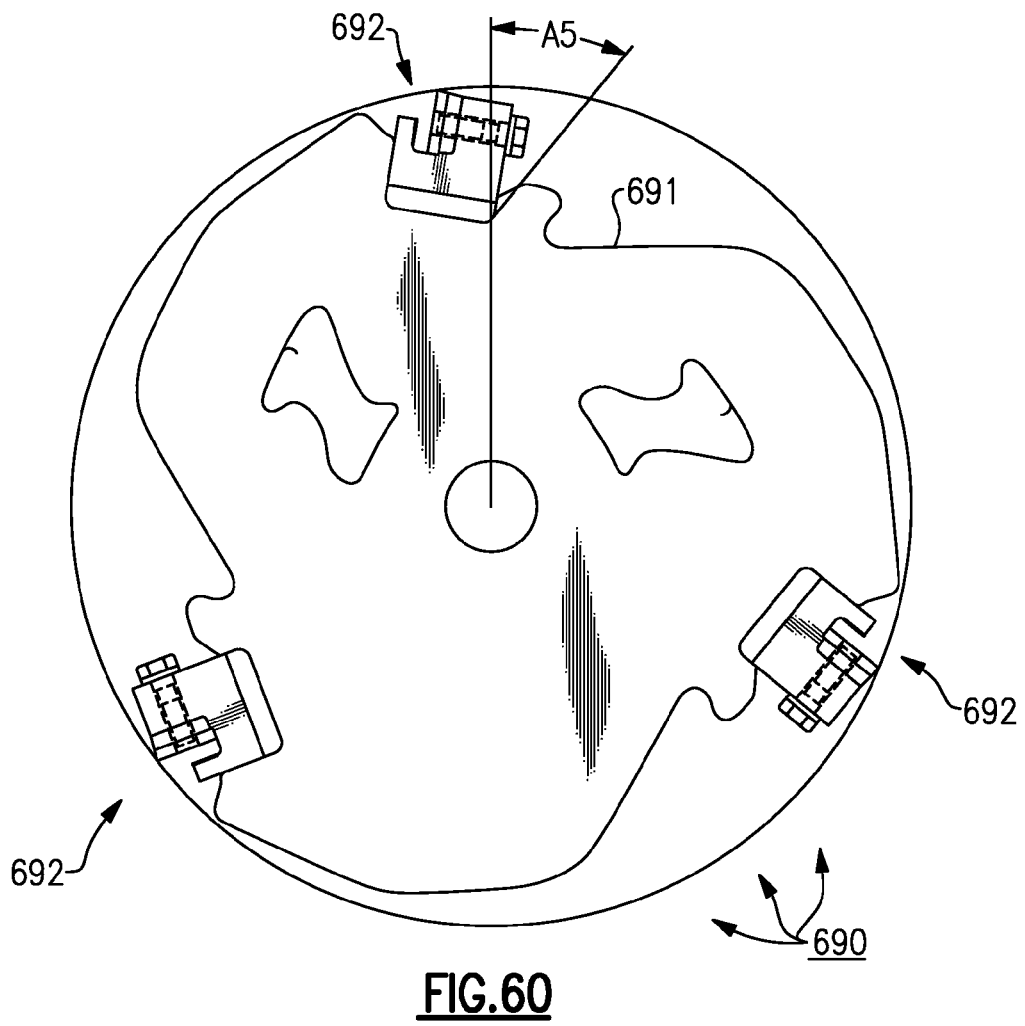

FIGS. 59 and 60 show various portions of rotating disc assembly 690, including: disc member 691; and bit holder sub-assembly 692.

Figure 61:
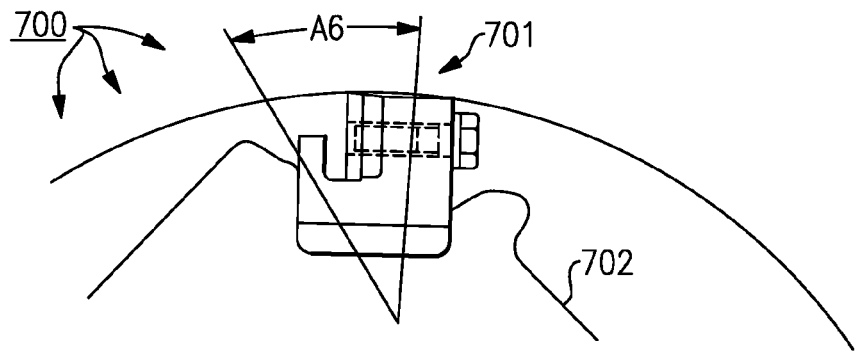
FIG. 61 shows a portion of a sixteenth embodiment of a rotating disc assembly according to the present invention.

FIG. 61 shows a portion of rotating disc assembly 700, including: disc member 702; and bit holder sub-assembly 701.

Figure 62:
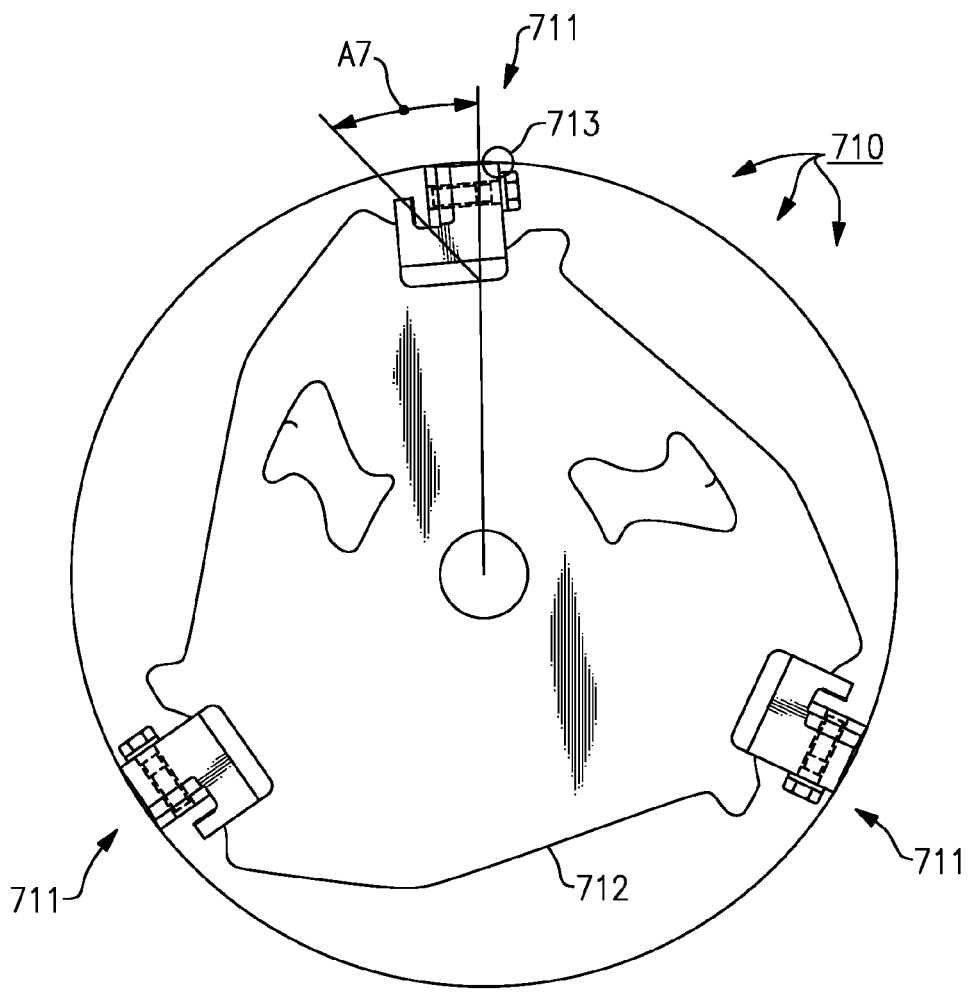
FIG. 62 shows a seventeenth embodiment of a rotating disc assembly according to the present invention.
Figure 65:
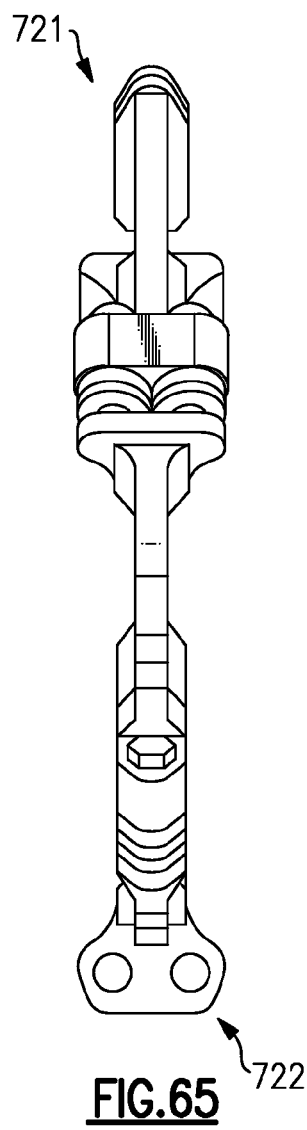

FIG. 62 shows rotating disc assembly 710, including: disc member 712; and bit holder sub-assemblies 711. Bit holder sub-assemblies 711 each include rising rear corner 713.

FIGS. 63, 64, 65 and 67 show rotating disc assembly 720, including: disc member 721; first type bit holder sub-assemblies 722; and second type bit holder sub-assemblies 723.

Figure 66:
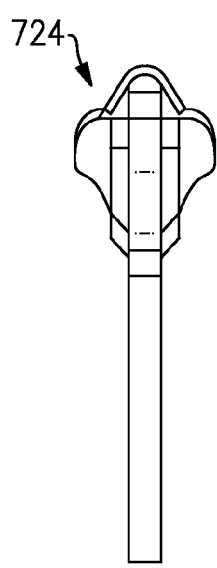
FIG. 66 shows a bit holder sub-assembly suitable for use in the present invention.
Figure 67:
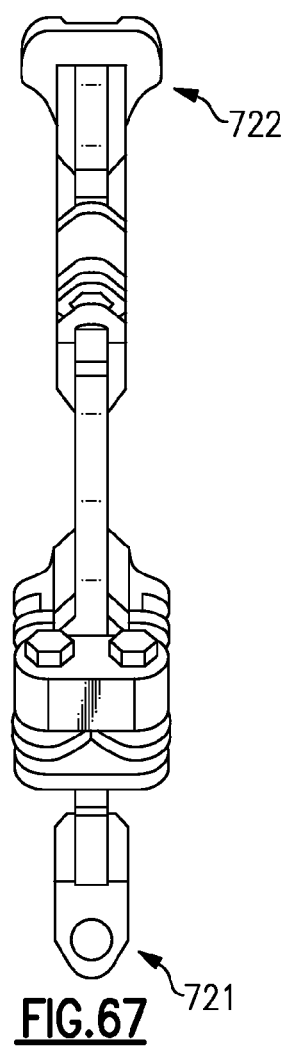

FIG. 66 shows third type bit holder sub-assembly 724, which may, alternatively or additionally, be used in the rotating disc embodiment of FIGS. 63 and 64.

Figure 68:
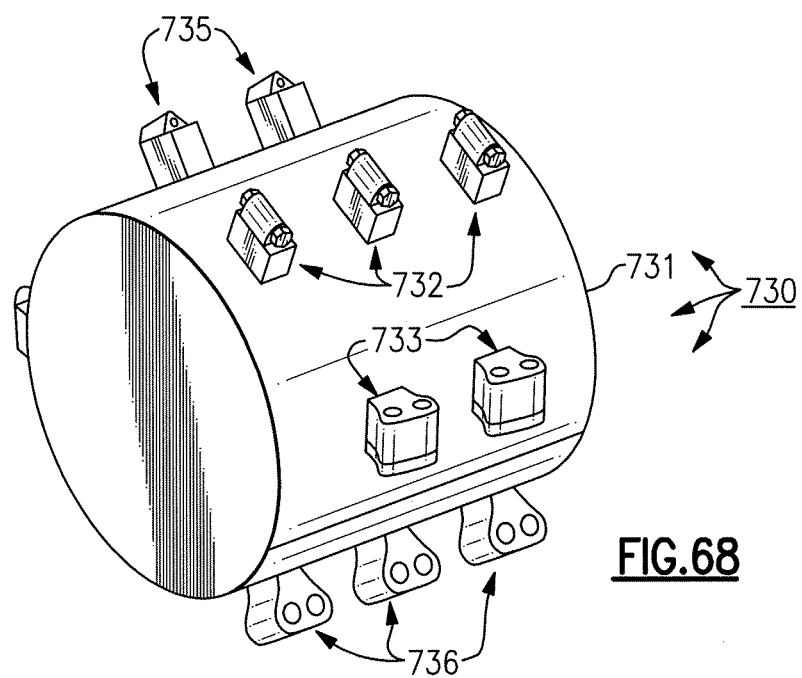
FIG. 68 shows a nineteenth embodiment of a rotating disc assembly according to the present invention.

FIG. 68 shows rotating disc assembly, including: drum shaped disc 731; first bit holder sub-assembly 732 (including three discrete sub-sub-assemblies, not separately reference numeraled); second bit holder sub-assembly 733 (including two discrete sub-sub-assemblies, not separately reference numeraled); third bit holder sub-assembly 735 (including two discrete sub-sub-assemblies, not separately reference numeraled); and fourth bit holder sub-assembly 736 (including three discrete sub-sub-assemblies, not separately reference numeraled). In this embodiment with a disc in the shape of an axially-wide drum, the bit footprint of each bit (respectively located at angularly aligned positions around the circumference of the drum) is not even continuous, but rather made up of two or three discrete portions as shown in FIG. 68. There are many different kinds of bit footprints in the embodiment of FIG. 68.

Figure 69:
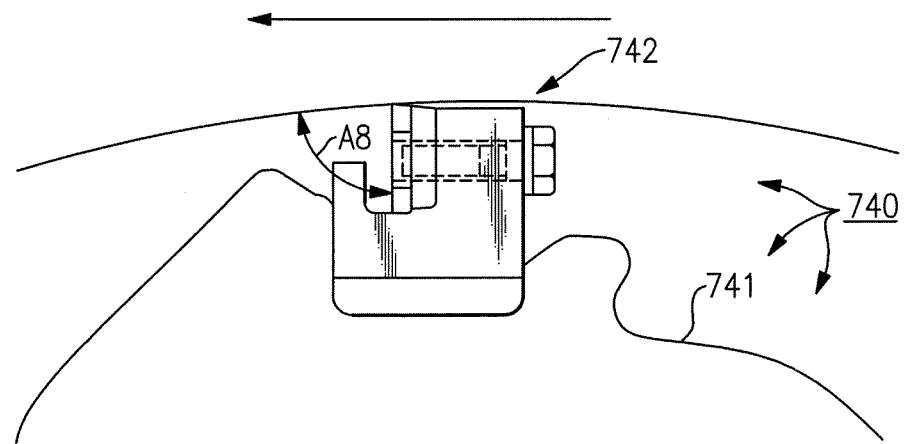
FIG. 69 shows a portion of a twentieth embodiment of a rotating disc assembly according to the present invention.

FIG. 69 shows a portion of rotating disc assembly 740, including: disc member 741; and bit holder sub-assembly 742.

Figure 70:
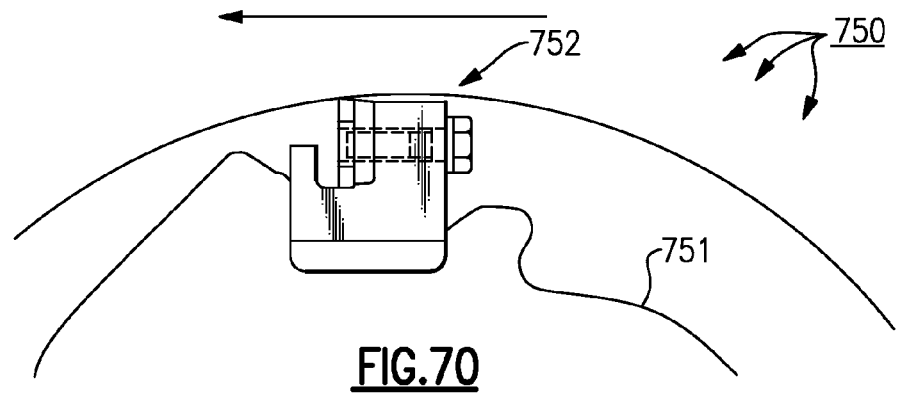
FIG. 70 shows a portion of a twenty-first embodiment of a rotating disc assembly according to the present invention.

FIG. 70 shows a portion of rotating disc assembly 750, including: disc member 751; and bit holder sub-assembly 752.

Figure 71:
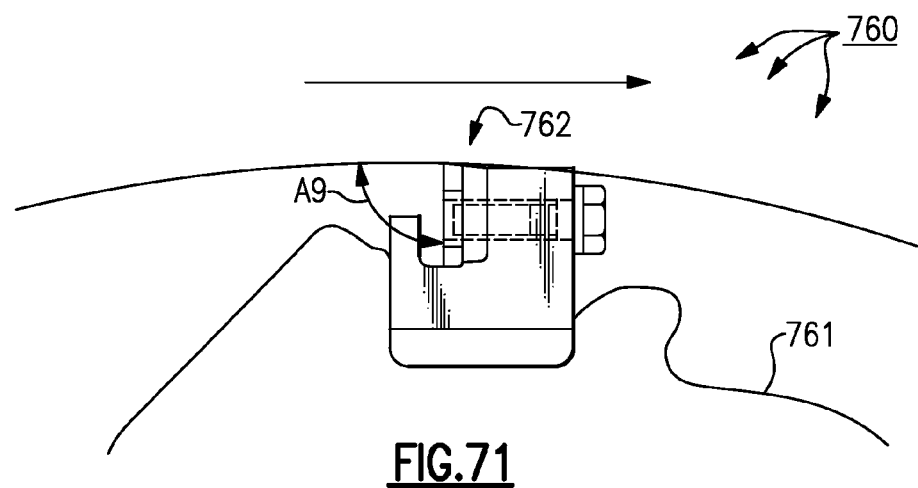
FIG. 71 shows a portion of a twenty-second embodiment of a rotating disc assembly according to the present invention.

FIG. 71 shows a portion of rotating disc assembly 760, including: disc member 761; and bit holder sub-assembly 762.

Figure 72:
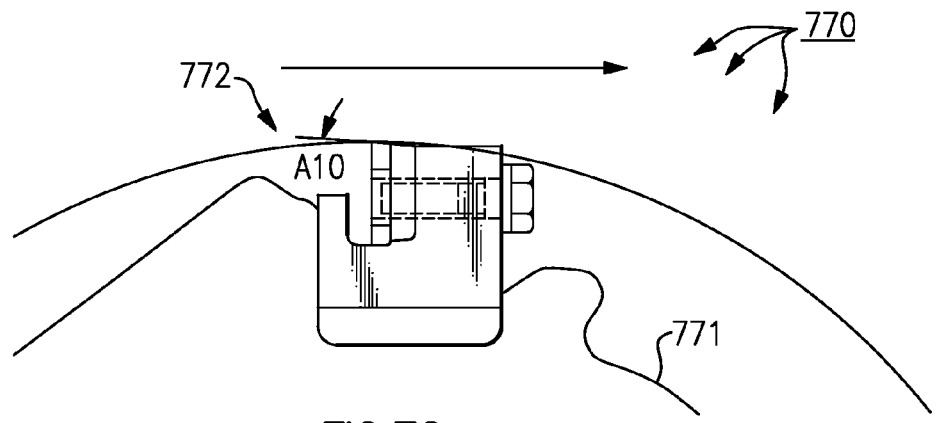
FIG. 72 shows a portion of a twenty-third embodiment of a rotating disc assembly according to the present invention.

FIG. 72 shows a portion of rotating disc assembly 770, including: disc member 771; and bit holder sub-assembly 772.

Figure 73:
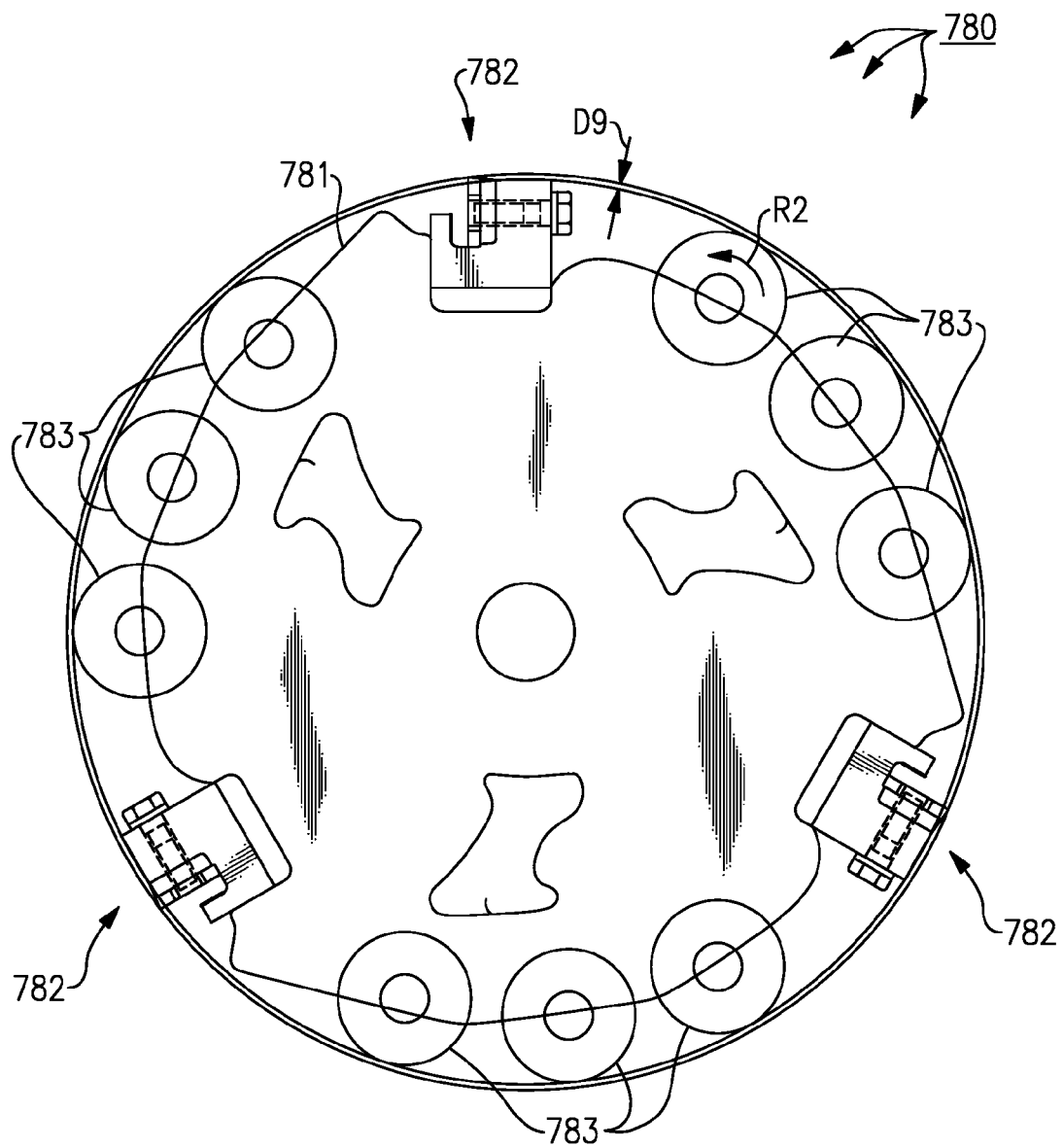
FIG. 73 shows a twenty-fourth embodiment of a rotating disc assembly according to the present invention.
Figure 77:
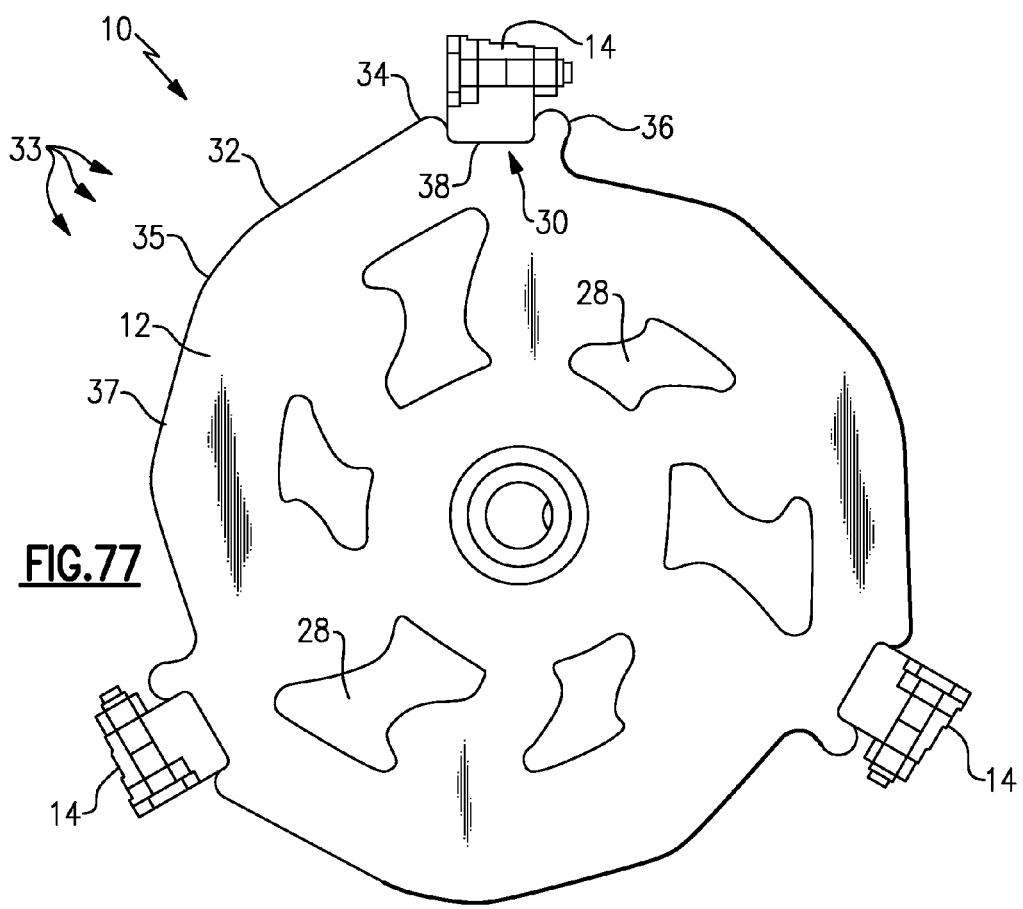
FIGS. 77 to 86 correspond to FIGS. 1 to 5 of U.S. non-provisional patent application Ser. No. 12/544,146, filed on Aug. 19, 2009, which has been incorporated by reference. These Figures are fully described in that document, so that description need not be repeated here.
Figure 78:
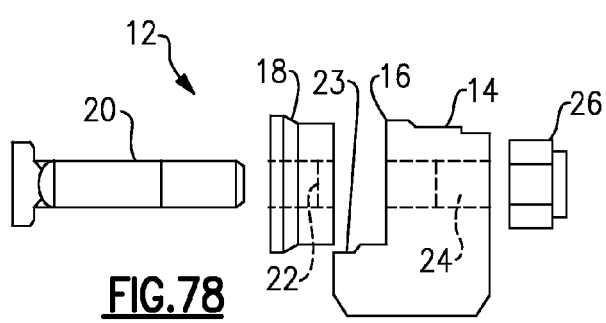
Figure 79:
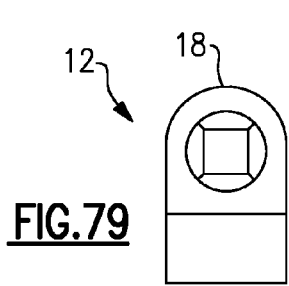
Figure 80:
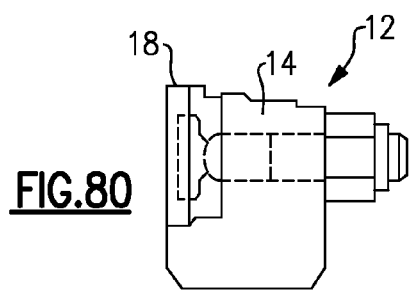
Figure 81:
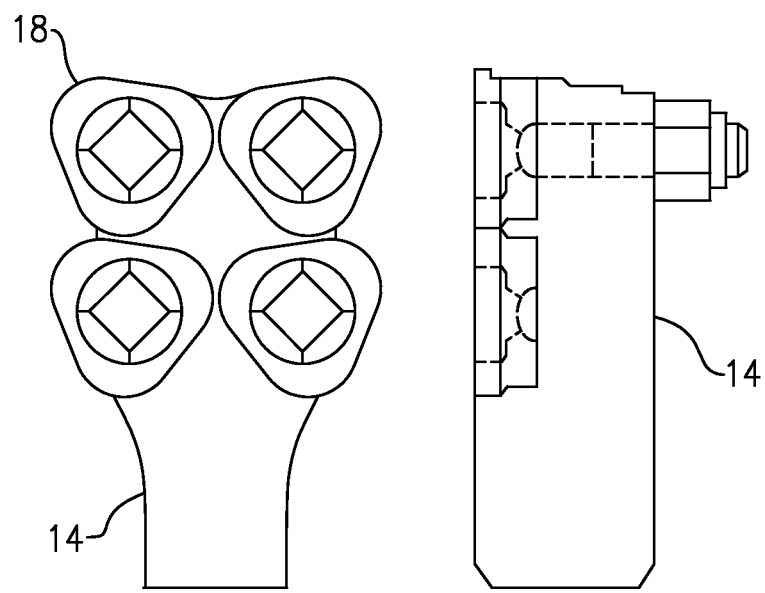
Figure 82:
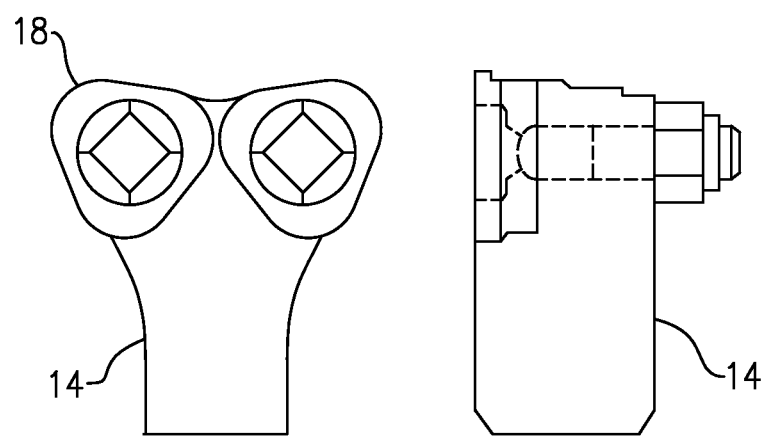

FIG. 73 shows rotating disc assembly 780, including: disc member 781; bit holder sub-assemblies 782; and rollers 783.

FIGS. 74 to 76 show various portions of rotating disc assembly 790, including: disc member 791; first type bit sub-assembly 792; and second type bit sub-assembly 793a. First type bit sub-assembly includes: first type bit holder 793; and generally cylindrical bit 795. Second type bit sub-assembly 793a includes: second type bit holder 794; and zig-zag shaped bit 796. Assembly 790 is an embodiment of the present invention, at least in the sense that it includes two different types of bit sub-assemblies, having two respective, different bit footprints, on a single disc. However, assembly 790 is not a preferred embodiment of the present invention. For example, as can be seen most clearly in FIG. 74, the entire bit footprint is exposed, and none of it is protected by the body of the disc, or by the bit holder. In first type bit sub-assembly 792, the front face of bit 795 is close to perpendicular to the viewing vector used to define the footprint. In second type bit sub-assembly 793a, the front face of bit 796 is not perpendicular to the viewing vector used to define the footprint. The footprint of first type bit holder 793 is shown as the dotted area of FIG. 75. This footprint of the bit holder 793 is completely covered by the disc 791 (in part) and the bit 795 (in part). This is preferred so that the bit holder is not damaged in operation. The footprint of second type bit holder 794 is shown as the dotted area of FIG. 76. This footprint of the bit holder 794 is not completely because portions of it extend past the footprint of its bit 796. This is not preferred because the exposed portions of bit holder 794 may be damaged in operation. Second bit 796 includes unsupported portions 797 and 798 which are sharp corners and/or portions that extend relatively far beyond the footprint of the bit holder. This is not preferred because it make it more likely that the bit will break and/or wear more quickly.

FIGS. 77 to 86 correspond to FIGS. 1 to 5 of U.S. non-provisional patent application Ser. No. 12/544,146, filed on Aug. 19, 2009, which has been incorporated by reference. These Figures are fully described in that document, so that description need not be repeated here.

I. Rock Stop Layer

As shown in FIG. 3, the rock stop layer 214 has a higher mechanical hardness, at least in part, than the underlying disc 202. The high hardness prevents damage and/or wear to the outer peripheral surface of the disc cause by: (i) impacts with hard debris (for example, rocks); and (ii) wear caused by flow of soil relative to the peripheral edge. For example, the rock stop layer can help prevent the soil from wearing a groove into the disc in the vicinity of the leading edge of well 204.

In some preferred embodiments he rock stop layer may be made of a matrix of hard and soft material, such as a weld material including hard fragments of carbide. This use of hard and soft materials in the rock stop layer means that it will tend to accumulate dirt in use. This accumulation of dirt provides a helpful dirt/dirt interface between the peripheral edge of the rotating disc assembly 200 and the dirt in which it is rotating and grinding.

In many preferred embodiments, and unlike in assembly 200, the rock stop layer does not extend in the angular direction around the entire periphery of the disc. For example, in embodiments with a radial ramp (discussed in more detail below), the rock stop layer may only be located in the vicinity of the top portion of the radial ramp segments.

Figures 9A, 9B, 9C, 9D:
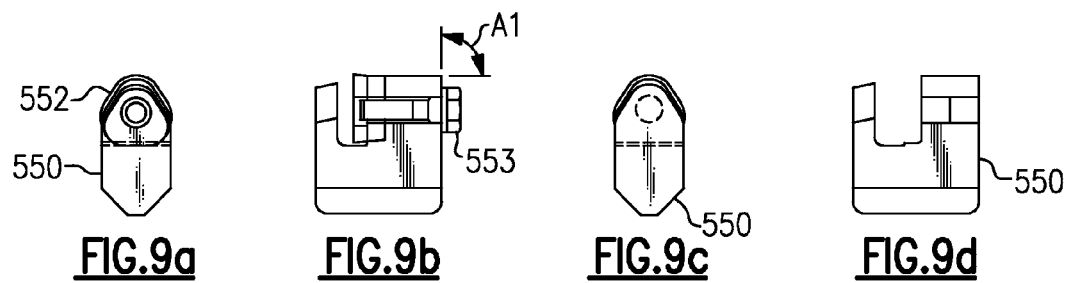
FIGS. 9a to 9e show various portions of a seventh embodiment of a rotating disc assembly according to the present invention.
Figure 9E:
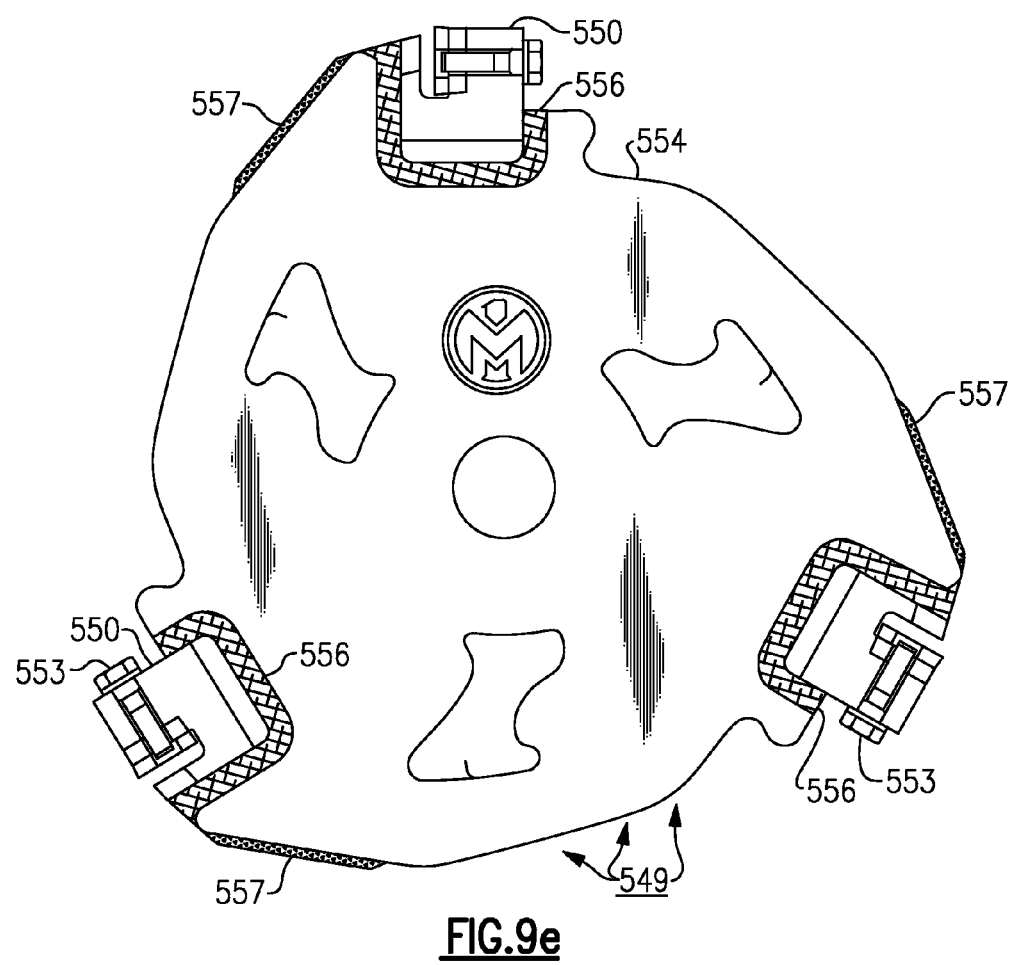
Figure 10:
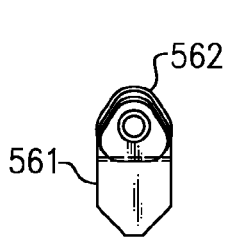
FIGS. 10 to 15 show various portions of an eighth embodiment of a rotating disc assembly.
Figure 11:
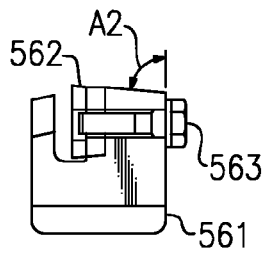
Figure 12:
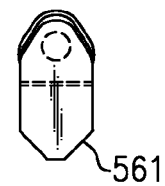
Figure 13:
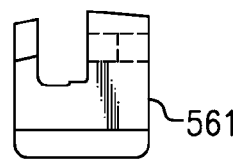
Figure 14:
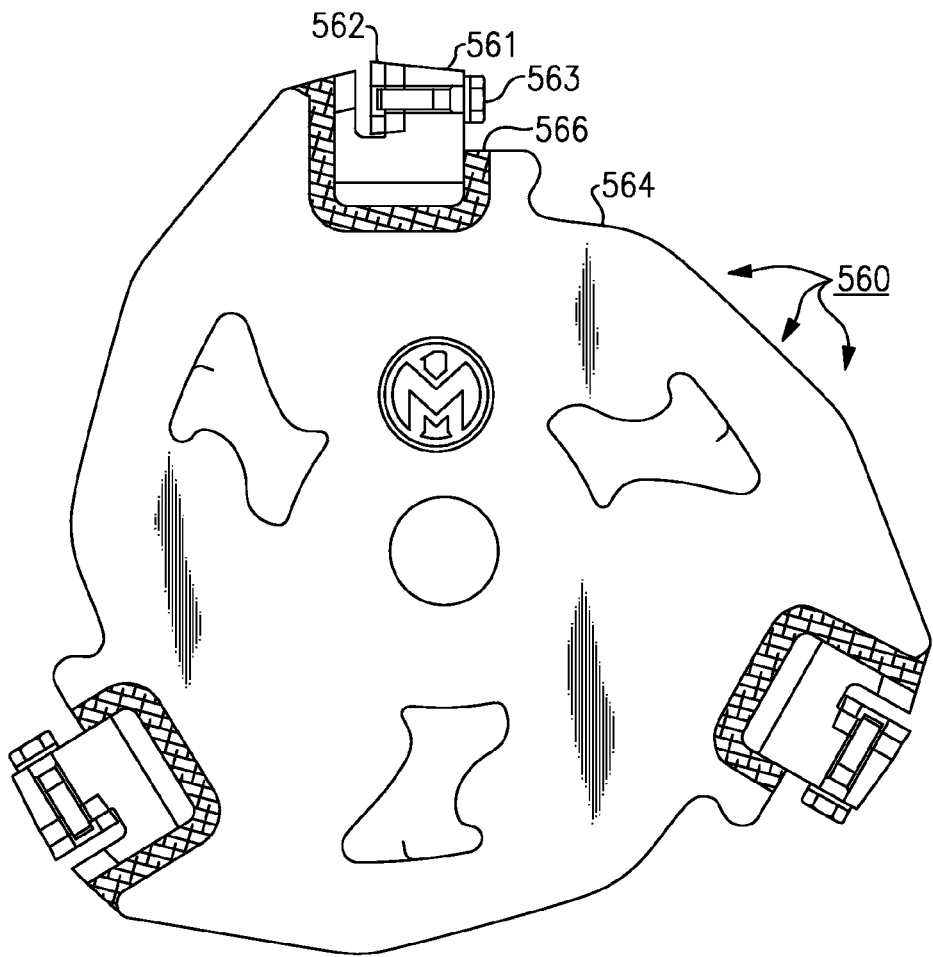
Figure 15:
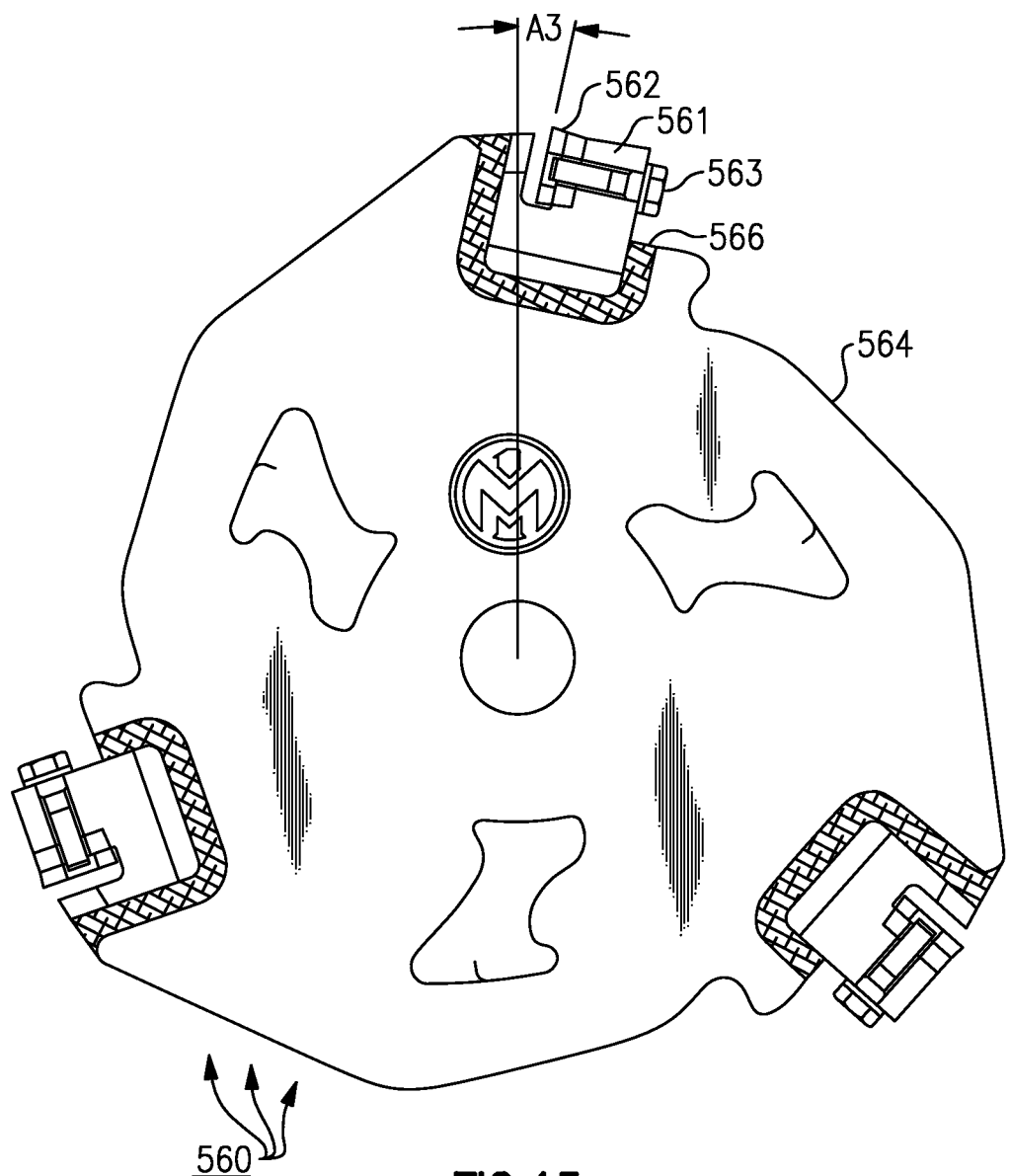

FIG. 9e shows a preferred embodiment of a rotating disc assembly including a rock stop layer. As shown in FIG. 9e, the rock stop hard surface does not extend all the way around the peripheral edge of the disc, but rather is over a relatively small angular range leading each well in the disc. Also, the disc is made to be flat, rather than curved, over the angular range where the rock stop layer is adhered to the disc. This may be preferred for better performance and/or adherence of the rock stop layer. It is further noted that at least some embodiments of the rock stop may be preferable to the "protectors" discussed above in connection with Riesselman because: (i) they can be shaped as a thin layer, rather than a removable "tool" with a high profile in the radial direction; (ii) they can be made of a hard/soft material matrix to promote adherence of dirt and a favorable dirt/dirt rotational interface; and/or (iii) placement of the rock stop layer immediately leading the well may help prevent a groove from being worn in the disc in the vicinity of the leading edge of the well.

II. Radial Ramp Over an Angular Range Leading the Bit Sub-Assembly

As shown In FIG. 4, disc 302 has a radial ramp over a range of angles leading its bit sub-assembly 308, 312. More specifically, over the range of angles A1, measured in the rotational direction starting from the leading edge of the bit sub-assembly (or the leading edge of the well in embodiments having a well). As shown in FIG. 4, the radial dimension of the disc at the leading edge of the bit sub-assembly is D3, while the radial dimension of the disc at the beginning of the ramp is D4. This is considered as a ramp because D3 is larger than D4.

The use of the radial ramp may be helpful for one or more of the following reasons: (i) facilitate effective grinding even when the bit does not extend very far from the disc in the radial direction; (ii) help prevent a groove from being worn in the vicinity of the leading edge of the well; (iii) help prevent rotating disc assembly from high shock impact with hard debris (for example, rocks); and/or (iv) help prevent rotating disc assembly from throwing hard debris (for example, rocks).

Assembly 300 has been simplified for purposes of illustration of the concepts involved and of the full possible scope of the present invention. Assembly 300 has only one bit sub-assembly and one radial ramp, but this is not necessarily preferred. Assembly 300 has a radial ramp in the shape of a smooth spiral, but this is not necessarily preferred.

Various embodiments of radial ramps according to the present invention may also be seen in FIGS. 9e, 14, 15, 16, 17, 22, 23, 24, 56, 57, 60, 62 and 63. The radial ramp feature may also be shown at App. Dwg. 1 (see Appendix). One preferred feature of these other radial ramp embodiments is that they include at least one "linear segment" that is at least substantially linear in the angular-radial plane, as contrasted with the smooth spiral of the radial ramp of assembly 300. It is also preferred to have a radial ramp linear segment immediately leading a bit-sub-assembly and/or an associated well formed in the disc. The angles of linear segments of radial ramps according to the present invention may be adjusted depending upon the nature and composition of the material to be ground and/or encountered by the grinding tool during grinding operations.

III. Relatively Small Bit Extension Beyond the Disc in the Radial and/or Axial Directions As shown in FIG. 5, the bit (shown but no reference numeral) extends (at its radially outermost point(s)) beyond the disc (at its radially outermost point(s)) by a dimension of D5. D5 is intentionally made small according to at least some embodiments of the present invention, in contravention of convention teaching. Making D5 relatively small may be helpful for one or more of the following reasons: (i) reduce or eliminate high mechanical shock impacts with hard debris; (ii) help prevent the launching of loose hard debris (for example, rocks) by relative square impacts with the bits; (iii) allow grinding tool to run at higher rotational speeds; and/or (iv) allow grinding tool to be made with steeper (more efficient) cutting angles of its bits.

Rotating disc assembly 350 may be more preferred for some applications than others. For example, it may be better for stump grinding in rocky soil (for example, typical soil in New England) than for stump grinding in sandy or clay type soil characteristic of the American Southeast. More specifically, the small radial extension D5 of the bit reduces the grinding speed, at least when there is not a lot of hard debris and a reduced associated potential for high shock impacts.

Preferably, the radial extension of the bit beyond the disc is less than 3/16 inch. Even more preferably, the radial extension of the bit beyond the disc is less than or equal to 1/8 inch. The relatively small radial bit extension is especially preferred in combination with a disc having radial ramps and/or a rock stop, as discussed above.

Various other embodiments of rotating disc assemblies including bit(s) having a relatively small radial extension beyond the disc according to the present invention may be seen in FIGS. 9e, 14, 15, 16, 17, 22, 23, 24, 56, 57, 59, 60-63 and 69-72. It is noted that in the embodiment of FIG. 63, some of the bits do not extend radially beyond the outermost radial portions of the disc at all, but those bits that do extend beyond, extend beyond only by a relatively short distance.

As shown in FIG. 6, the bit extends (at its axially outermost point(s)) beyond the disc (at its axially outermost point(s)) by a dimension of D6. D6 is intentionally made small according to at least some embodiments of the present invention, in contravention of conventional teaching. Making D6 relatively small may be helpful for one or more of the following reasons: (i) reduce or eliminate high mechanical shock impacts with hard debris; (ii) help prevent the launching of loose hard debris (for example, rocks) by relative square impacts with the bits; (iii) allow grinding tool to run at higher rotational speeds; (iv) allow grinding tool to be made with steeper (more efficient) cutting angles of its bits; and/or (v) help maintain grinding tool in an upright position despite lateral or tilting forces caused by axial side impacts.

IV. Non-Rigid Bit Sub-Assembly Mounting Hardware

As shown in FIG. 7, in disc assembly 450, the mounting hardware 456 makes a non-rigid connection between the bit sub-assembly 456, 458, 462 and well 454 formed in disc 452. A well may not be required in all embodiments of the present invention. The non-rigid connection provided by mounting hardware 456 preferably: (i) absorbs mechanical shocks caused by impacts between the bit and hard debris; and/or (ii) allow the bit to deflect to reduce the mechanical shock and/or bit wear caused by relatively glancing impacts with hard debris. The non-rigid mounting hardware feature of the present invention is thought to be especially advantageous in combination with the small radial and/or axial bit extension features described above because: (i) the small extensions reduce or eliminate square impacts; and (ii) the give provided by the non-rigid mounting hardware helps to deal with glancing impacts.

In some preferred embodiments of the present invention, the non-rigid mounting hardware will include deformable material such as rubber, other elastomeric material, mesh and/or fluid filled material. Alternatively or additionally, the mounting hardware may include pivoting hardware that allows the bit sub-assembly to pivot somewhat relative to the disc.

Other non-rigid mounting hardware according to the present invention is shown in FIGS. 32-35.

V. Bits of Different Profiles

As shown in FIGS. 8a and 8b, a rotating disc assembly 500 has a first type of bit and a second type of bit, where: (i) the first type of bit extends further in the radial direction than the second of bit; and (ii) the second of bit extends further in the axial direction than the first type of bit. More specifically, the first type of bit 525 extends in the radial direction (at its radially outermost point(s)) beyond the second type of bit 527 (at its radially outermost point(s)) by a dimension of D7. Also, as shown in FIG. 8b, the second type of bit 527 extends in the axial direction (at its axially outermost point(s)) beyond the first type of bit (at its radially outermost point(s)) by a dimension of D8.

Preferably, there are multiple first type bit sub-assemblies and multiple second type bit sub-assemblies and they are located at regular angular intervals around the disc in an alternating manner. Preferably, the first type bit sub-assemblies are distributed around the disc so that they are in rotational balance when considered in isolation of the disc and of the second type bit sub-assemblies (See FIG. 24.) Preferably, the second type bit sub-assemblies are distributed around the disc so that they are in rotational balance when considered in isolation of the disc and of the first type bit sub-assemblies (See FIG. 24.) Some embodiments of the present invention may have more than two types of bit sub-assemblies.

Other rotating disc assemblies including two different types of bit sub-assemblies according to the present invention are shown in FIGS. 24, 63 and 64.

VI. Guide Protrusions

FIGS. 56 and 57 show pairs of guide protrusions according to the present invention. As shown in FIG. 57, each guide protrusion has a rock stop side and a chip flow side. The guide protrusions can be helpful in: (i) deflecting square impacts with hard debris (for example, rocks); (ii) preventing impacts between hard debris and the peripheral sides of the bit and/or bit holder; and (iii) directing the flow of chips in along a preferred path. In some preferred embodiments, the guide protrusions are formed as a single piece with the disc, but that is not necessarily required.

VII. Rollers

As shown in FIG. 73, some embodiments of rotating disc assemblies according to the present invention include rollers. The rollers rotate with the rotating disc, of course, but they are also free to rotate about their respective centers in direction R2 (see FIG. 73). Although all of the rollers shown in FIG. 73 extend equally far in the radial direction (as defining by the rotating disc), this is not necessarily required.

One reason that at least some embodiments of the rollers of FIG. 73 are different than the "protectors" of Riesselman is that they are free to rotate about their respective centers, while the protectors of Riesselman are respectively fixed, at least during grinding operations, about their respective rotational centers.

Another reason that some embodiments of the rollers of FIG. 73 are different than the protectors of Riesselman is that there are multiple rollers between consecutive bit sub-assemblies. However, some embodiments of the present invention may have only a single roller between consecutive bit sub-assemblies.

The rollers may be helpful for one or more of the following reasons: (i) reduce or eliminate high mechanical shock impacts with hard debris; (ii) help prevent the launching of loose hard debris (for example, rocks) by relative square impacts with the bits; (iii) allow grinding tool to run at higher rotational speeds; and/or (iv) allow grinding tool to be made with steeper (more efficient) cutting angles of its bits.

VIII. Component Angles for Optimized Performance

The angles between various components of a rotating disc assembly are controlled to be at certain values or in certain ranges in order to optimize performance or optimize performance with respect to certain types and/or distributions of types of subject matter to be ground by the grinding tool, as shown in FIGS. 59-62 and 69-72.

IX. The Embodiment of FIG. 68

A rotating disc assembly may be made to be similar to and/or incorporate various concepts of the rotating disc assembly embodiment shown in FIG. 68. FIG. 68 may be especially preferred for mowing applications, mulching applications, tub grinder applications and/or horizontal grinder applications. Preferably, embodiments similar to FIG. 68 would also have radial ramps and/or rock stops as discussed above.

X. Bolt Across the Disc and Bit Holder(s)

A rotating disc assembly may include a disc, a first bit holder, a second bit holder and one (or more) nut and bolt sub-assembly to mechanically the first and second bit holders to the disc. As shown in FIGS. 47-48, the bolt(s) of the nut and bolt assembly(ies) are at parallel to the axis of rotation of the rotating disc assembly.

XI. Angles

Throughout the drawings, various angles are reference numeraled as A1 to A10. A10: is 90 degrees to the leading edge arc defined by a center at the axis of rotation of the rotating disc assembly and a radius defined by the radial dimension of the disc at the leading edge of the corresponding bit sub-assembly; which shall be referred to as top rake angle. A9: is greater than 90 degrees. A8: is less than 90 degrees. A7 & A6: (identical) some exemplary angles shown in the Figures. A5 & A4: (identical). A4: is less than 90 degrees (zoomed in from A5). A3: exemplary value shown in the Figures. A3 to A10 are all describing the top rake angle. Preferred embodiments are 90 degrees+/−20 degrees. Preferential range is 90 degrees+/−75 degrees. A2 and A1: are varying amounts of top clearance angle. Preferred embodiment range would be 0 to 20 degrees. Preferential range is 0 to 75 degrees.

DEFINITIONS

The following definitions are provided to facilitate claim interpretation:

Present invention: means at least some embodiments of the present invention; references to various feature(s) of the "present invention" throughout this document do not mean that all claimed embodiments or methods include the referenced feature(s).

First, second, third, etc. ("ordinals"): Unless otherwise noted, ordinals only serve to distinguish or identify (e.g., various members of a group); the mere use of ordinals implies neither a consecutive numerical limit nor a serial limitation.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, force fit connections, friction fit connections, connections secured by engagement added by gravitational forces, quick-release connections, pivoting or rotatable connections, slidable mechanical connections, latches and/or magnetic connections).

Grinding tools: any tool for grinding any type of matter; grinding tools include, but are not necessarily limited to: mowers, mulchers; horizontal grinders; tub grinders and/or stump grinders; electric motor powered grinding tools, internal combustion powered grinding tools; man-portable grinding tools; stationary grinding tools; and/or vehicle portable grinding tools.

Outdoor grinding tools: any grinding tool designed primary for use in an outdoor environment typically including one or more of the following materials: stumps, live plants, brush, soil, clay, sand, small rocks, large rocks, medium rocks, man-made debris (for example, sidewalk, discarded trash); outdoor grinding tools include, but are not necessarily limited to: mowers, mulchers; outdoor horizontal grinders; outdoor tub grinders and/or stump grinders.

Disc: any member that defines a central axis and two major surfaces and is shaped to be suitable for being driven into rotation about its central axis, without regard to: (i) whether its shape is particularly circular; (ii) flatness in the axial direction; (iii) whether it is formed as a single piece; and/or (iv) presence or absence of holes or apertures through the disc; it is highly preferable for discs to be rotationally balanced with respect to both angular distribution of mass and axial distribution of mass, but this is not necessarily required; in some embodiments of the present invention, the "disc" may take the form of a drum, having multiple bit sub-assemblies along its relatively long axial dimension.

Bit: any member suitable for being driven into rotation to grind soil, debris and/or plant matter: (i) material used to make the bit; (ii) number of pieces making up the bit; (iii) number of cutting edges on the bit; (iv) whether the bit is more suitable for grinding stumps, brush or live trees; and/or (v) specific shape of the bit holder.

Bit holder: any hardware for securing a bit without regard to: (i) the type of hardware used to secure the bit; (ii) presence or absence of a leading portion; (iii) material used to make the bit holder; (iv) number of pieces making up the bit holder; and/or (v) specific shape of the bit holder.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control. If the definitions provided above are broader than the ordinary, plain, and accustomed meanings in some aspect, then the above definitions shall be considered to broaden the claim accordingly.

To the extent that a patentee may act as its own lexicographer under applicable law, it is hereby further directed that all words appearing in the claims section, except for the above-defined words, shall take on their ordinary, plain, and accustomed meanings (as generally shown by documents such as dictionaries and/or technical lexicons), and shall not be considered to be specially defined in this specification. In the situation where a word or term used in the claims has more than one alternative ordinary, plain and accustomed meaning, the broadest definition that is consistent with technological feasibility and not directly inconsistent with the specification shall control.

Unless otherwise explicitly provided in the claim language, steps in method steps or process claims need only be performed in the same time order as the order the steps are recited in the claim only to the extent that impossibility or extreme feasibility problems dictate that the recited step order (or portion of the recited step order) be used. This broad interpretation with respect to step order is to be used regardless of whether the alternative time ordering(s) of the claimed steps is particularly mentioned or discussed in this document.

What is claimed is:

1. A rotating disc assembly for use on a stump grinder comprising:
    a bit securing sub-assembly comprising a rotating disc member defining a peripheral edge and a bit holder member mechanically connected to said rotating disc member and that defines a recess having a first portion extending in a first direction, a second portion extending from said first portion along a second direction that is not parallel to said first direction, and a third portion extending from said second portion in a third direction that is substantially parallel to and spaced from said first direction; and
    a first bit that is mechanically connected to said bit holder member and positioned within said recess by a fastening hardware that extends through co-axially aligned holes formed in said bit holder member and said first bit and along an axis that is essentially parallel to the direction of travel of said rotating disc member;
    wherein the first bit and the bit securing sub-assembly are sized, shaped, located and/or connected so that a footprint of the first bit is at least partially shielded by a corresponding footprint of the bit securing sub-assembly.

2. The assembly of claim 1 wherein the footprint of the first bit is at least 50% shielded by a corresponding footprint of the bit securing sub-assembly.

3. The assembly of claim 1 wherein the footprint of the first bit is at least 90% shielded by a corresponding footprint of the bit securing sub-assembly.

4. The assembly of claim 1 wherein:
    the first bit is located in the recess of the bit holder member so that the bit holder member at least partially shields the footprint of the first bit.

5. The assembly of claim 4 wherein the fastening hardware is a screw.

6. The assembly of claim 4 further comprising a bit cap that is fastened to the bit and the bit holder by the fastening hardware.

7. The assembly of claim 4 further comprising a bit backing member that is fastened between the bit and the bit holder by the fastening hardware.

8. The assembly of claim 4 further comprising an isolator member structured and/or located to mechanically connect the bit holder to the disc member and provide a shock absorbing buffer therebetween.

9. The assembly of claim 4 wherein the first bit holder comprises a first bit holder piece and a second bit holder piece mechanically connected together so that the first bit holder piece at least partially shields the footprint of the first bit.

* * * * *